(12) United States Patent
Gould et al.

(10) Patent No.: US 7,792,963 B2
(45) Date of Patent: Sep. 7, 2010

(54) METHOD TO BLOCK UNAUTHORIZED NETWORK TRAFFIC IN A CABLE DATA NETWORK

(75) Inventors: Kenneth Gould, Oakton, VA (US); Andrew Danforth, Herndon, VA (US)

(73) Assignee: Time Warner Cable, Inc., New York, NY (US)

(*) Notice: Subject to any disclaimer, the term of this patent is extended or adjusted under 35 U.S.C. 154(b) by 1497 days.

(21) Appl. No.: 10/654,667

(22) Filed: Sep. 4, 2003

(65) Prior Publication Data

US 2005/0055708 A1   Mar. 10, 2005

(51) Int. Cl.
*G06F 15/173* (2006.01)
(52) U.S. Cl. .................................. 709/225; 709/229
(58) Field of Classification Search .................. 709/225
See application file for complete search history.

(56) References Cited

U.S. PATENT DOCUMENTS

| | | | |
|---|---|---|---|
| 6,009,475 A | 12/1999 | Shrader | |
| 6,098,172 A | 8/2000 | Coss et al. | |
| 6,141,749 A | 10/2000 | Coss et al. | |
| 6,154,775 A | 11/2000 | Coss et al. | |
| 6,170,012 B1 | 1/2001 | Coss et al. | |
| 6,266,664 B1 | 7/2001 | Russell-Falla et al. | |
| 6,502,102 B1 | 12/2002 | Haswell et al. | |
| 6,523,027 B1 | 2/2003 | Underwood | |
| 6,542,508 B1 | 4/2003 | Lin | |
| 6,546,423 B1 | 4/2003 | Dutta et al. | |
| 6,553,568 B1 | 4/2003 | Fijolek et al. | |
| 6,574,666 B1 | 6/2003 | Dutta et al. | |
| 6,574,795 B1 | 6/2003 | Carr | |
| 6,594,467 B2 | 7/2003 | Asia et al. | |
| 7,539,748 B2 * | 5/2009 | Williams | 709/224 |
| 2001/0042213 A1 | 11/2001 | Jemes et al. | |
| 2001/0044818 A1 * | 11/2001 | Liang | 709/201 |
| 2001/0048683 A1 | 12/2001 | Allan et al. | |
| 2002/0065938 A1 | 5/2002 | Jungek et al. | |
| 2002/0066030 A1 | 5/2002 | Brawn et al. | |
| 2002/0080771 A1 | 6/2002 | Krumel | |
| 2002/0080784 A1 | 6/2002 | Krumel | |
| 2002/0083331 A1 | 6/2002 | Krumel | |
| 2002/0083344 A1 | 6/2002 | Vairavan | |
| 2002/0112188 A1 | 8/2002 | Syvanne | |
| 2002/0112189 A1 | 8/2002 | Syvanne et al. | |
| 2002/0116644 A1 | 8/2002 | Richard | |

(Continued)

OTHER PUBLICATIONS

Miercom, Lab Testing Summary Report, Report 110702, Jul. 2002, Mier Communications, Inc., Princeton Junction, NJ.

(Continued)

*Primary Examiner*—Vivek Srivastava
*Assistant Examiner*—Ryan J Jakovac
(74) *Attorney, Agent, or Firm*—The Marbury Law Group, PLLC

(57) ABSTRACT

The present invention teaches methods and systems for subscriber blocking of unauthorized network traffic in a cable data network. The cable modem termination system (CMTS) incorporates a data gateway agent that filters unauthorized traffic thereby eliminating consumption based subscribers from being responsible for related service charges. Embodiments incorporate the use of packet filtering, hybrid stateful packet filtering, content filtering, application layer filtering and time based filtering. Greater acceptance of consumption based billing is achieved by having the filter settings directed by the subscriber.

24 Claims, 15 Drawing Sheets

U.S. PATENT DOCUMENTS

| | | | |
|---|---|---|---|
| 2003/0018912 | A1 | 1/2003 | Boyle et al. |
| 2003/0018914 | A1 | 1/2003 | Cheng et al. |
| 2003/0046581 | A1 | 3/2003 | Call et al. |
| 2003/0051155 | A1 | 3/2003 | Martin |
| 2003/0069920 | A1 | 4/2003 | Melvin et al. |
| 2003/0072318 | A1 | 4/2003 | Lam et al. |
| 2003/0084317 | A1 | 5/2003 | Cohen |
| 2003/0084331 | A1 | 5/2003 | Dixon et al. |
| 2003/0182420 | A1* | 9/2003 | Jones et al. ............ 709/224 |
| 2004/0006621 | A1* | 1/2004 | Bellinson et al. ......... 709/225 |
| 2004/0111519 | A1* | 6/2004 | Fu et al. .............. 709/229 |
| 2007/0214083 | A1* | 9/2007 | Jones et al. ............ 705/41 |

OTHER PUBLICATIONS

Cisco Systems, Inc., Cable Monitor and Intercept Features for the Cisco CMTS, 2003, Cisco Systems, Inc., San Jose, CA.

Joel A. Pogar, Data Security in a Converged Network: A Siemens White Paper, 2003, Siemens Information and Communication Networks, Inc., Boca Raton, FL.

Brian A. Reed, Stateful Packet Inspection Explained.

Larry Smithmier, Linux IP Multicast How to Study Guide, 1998.

Seth Finkelstein and Lee Tien, Electronic Frontier Foundation White Paper 1 for NRC Project on Tools and Strategies for Protecting Kids from Pornography and Their Applicability to Other Inappropriate Internet Content.

Farley Stewart, Internet Acceptable Use Policies: Navigating the Management, Legal and Technical Issues, St. Bernard Software, Inc., San Diego, CA.

Communications Technology, Cable Modem Security: Insulating Your Network While Keeping Your Subscribers Safe From Each Other, Oct. 2001, Communications Technology.

Check Point Software Technologies, Ltd., Build Your Security Infrastructure with Best-of-Breed Products from OPSEC, 2003, Check Point Software Technologies, Ltd., Redwood City, CA.

P. Mockapetris, Domain Names—Implementation and Specification, Nov. 1987.

BOOTP and DHCP Parameters, Aug. 5, 2003, Internet Assigned Numbers Authority.

St. Bernard Software, Inc., Providing Comprehensive & Customizable Precision Internet Access Control for Business and Educational Organizations: An Overview of the Issues and Opportunities, Mar. 2002, St. Bernard Software, Inc., San Diego, CA.

Paris Trudeau, et al., Major Techniques for Classifying Spam, 2003, SurfControl plc.

Net Nanny Software Inc., Net Nanny 5: Child Safety Software for the Internet—User Guide, 1994-2003, Net Nanny Software, Inc., Bellevue, WA.

* cited by examiner

Data Transfer Settings

- ⊙ URL Filtering - allow by category
  - ⊙ Enter exceptions to deny
- ⊙ URL Filtering - allow by algorithm category
  - ⊙ Enter exceptions to deny

- ⊙ URL Filtering - deny by category
  - ⊙ Enter exceptions to allow
- ⊙ URL Filtering - deny by algorithm category
  - ⊙ Enter exceptions to allow

- ⊙ Data Filtering - Hybrid Stateful Inspection
  - ⊙ Enter exceptions to deny
  - ⊙ Enter exceptions to allow

- ⊙ Data Filtering - Time of Day
  - ⊙ Enter exceptions to peak
  - ⊙ Enter exceptions to off-peak

- ⊙ Port Filtering - allow by category
  - ⊙ Enter exceptions to deny
- ⊙ Port Filtering - allow by algorithm category
  - ⊙ Enter exceptions to deny

- ⊙ Port Filtering - deny by category
  - ⊙ Enter exceptions to allow
- ⊙ Port Filtering - deny by algorithm category
  - ⊙ Enter exceptions to allow

- ⊙ Content Filtering - by word list category
  - ⊙ Enter exceptions to allow
  - ⊙ Enter exceptions to deny
- ⊙ Content Filtering - allow by algorithm category
  - ⊙ Enter exceptions to allow
  - ⊙ Enter exceptions to deny

- ⊙ General Filtering - deny peer to peer  ⊙ Exceptions allow
- ⊙ General Filtering - deny instant message  ⊙ Exceptions allow
- ⊙ General Filtering - deny multicast  ⊙ Exceptions allow
- ⊙ General Filtering - deny mail  ⊙ Exceptions allow
- ⊙ General Filtering - deny FTP  ⊙ Exceptions allow
- ⊙ General Filtering - deny HTTP  ⊙ Exceptions allow

*Figure 9*

URL Filtering - Categories

- Hate/Discrimination
- Illegal
- Murder/Suicide
- School Cheating Information
- Violence/Offensive
- Weapons

- Adults Only
- Erotic Text
- Gross / Tasteless
- Lingerie
- Nudity
- Personal Information
- Personals
- Photo Searches
- Profanity
- Sex
- Swimsuits

- Alcohol
- Drugs
- Gambling
- Tobacco

- Chat
- Computing & Internet
- Hacking
- Hosting Sites
- Mail / E-mail
- Message/Bulletin Board
- Moderated
- Music / MP3 / Net Radio
- News Online
- P2P/Loopholes
- Remote Proxies
- Search Engines
- Search Terms
- Streaming Media
- Usenet News/Forums
- Web Page Hosting / Free Pages

- Advertisements
- Auction
- Electronic Commerce
- Finance & Investment
- Real Estate
- Shopping
- Stocks
- Travel

- Employment Search
- Career Development

- Arts & Entertainment
- Child Oriented Sites
- Education
- Food & Restaurants
- Games
- Government & Politics
- Health & Medicine
- History
- Hobbies & Recreation
- Jokes
- Lifestyle & Culture
- Motor Vehicles
- Other Reference
- Religion
- Sports

*Figure 10*

URL Filtering - Algorithm Categories

- ⊙ Auction / Online Purchasing
- ⊙ Drugs
- ⊙ Employment Search
- ⊙ Gambling
- ⊙ Hate/Discrimination
- ⊙ Illegal
- ⊙ Mail / E-mail
- ⊙ Music / MP3 / Net Radio
- ⊙ Pornography
- ⊙ Personal Information
- ⊙ Remote Proxies
- ⊙ Stock Trading
- ⊙ Weapons

*Figure 11*

Data Transfer Settings - Time Control

Weekday
- ⦿ Allow ○ Block   Daytime  [8:00 am] to [8:00 pm]
- ⦿ Allow ○ Block   Evening  [8:01 pm] to [1:00 am]

Weekend
- ⦿ Allow ○ Block   Daytime  [8:00 am] to [8:00 pm]
- ○ Allow ⦿ Block   Evening  [8:01 pm] to [1:00 am]

- ○ Allow ○ Block   Special 1  [Mon] [8:00 am] to [11:00 pm]
- ○ Allow ○ Block   Special 2  [Tue] [8:00 am] to [11:00 pm]
- ○ Allow ○ Block   Special 3  [Wed] [8:00 am] to [11:00 pm]
- ○ Allow ○ Block   Special 4  [Thu] [8:00 am] to [11:00 pm]
- ○ Allow ○ Block   Special 5  [Fri] [8:00 am] to [11:00 pm]
- ○ Allow ○ Block   Special 6  [Sat] [8:00 am] to [11:00 pm]
- ⦿ Allow ○ Block   Special 7  [Sun] [8:00 am] to [11:00 pm]

*Figure 12*

METHOD TO BLOCK UNAUTHORIZED NETWORK TRAFFIC IN A CABLE DATA NETWORK

FIELD OF THE INVENTION

The present invention relates to methods of enhancing cable Internet subscriber satisfaction by enforcing subscriber filtering requests at the cable modem termination system in a consumption based billing environment.

BACKGROUND OF THE INVENTION

The Internet, also termed the "information superhighway", has revolutionized how data and information can be accessed. Presently, "online" information sources mirror most of the information available from traditional sources such as newspapers, reference books, databases and other public information sources. Users are also able to subscribe to private information sources, order goods and services and download information content and receive radio and television transmissions. Communications between users is also available and includes "chat" rooms, semi-private virtual area networks, telephone service (termed voice over Internet protocol or VoIP) and online competitive video gaming.

As uses of the Internet increase, users seek faster connection speeds and greater bandwidth. Cable data networks are becoming a preferred solution in providing high data transfer rates to users at attractive pricing. At increased bandwidth, user enjoyment is enhanced with shorter wait and download times.

Internet use typically involves accessing remote Internet servers for purposes of downloading information or digital files as well as uploading files and messages. Access is accomplished by connecting a subscriber terminal or terminal means to a cable data network that is in turn connected to the Internet. Terminal means include traditional terminals, personal computers (PC) and game console devices equipped with network connectivity.

Additional devices are used between the terminal means and the cable data network. Such devices include local networking electronic devices as well as electronic devices that connect a local network or terminal means to an external network such as a cable data network. Examples of local networking devices include network hubs, network switches, network bridges, network interface cards, and the like. Cable modems connect terminal means or a local network to the cable data network. They may incorporate other functions such as firewall, VoIP access, and network hubs.

As used herein, Customer Premises Equipment (CPE) includes terminal means (such as terminals, personal computer or game consoles), local networking devices and electronic devices to connect a local network to an external network such as a carrier network (i.e. cable modem).

As used herein a "cable network" is a Data-Over-Cable (DOC) Network, which includes a network constructed from coaxial cable as well as a hybrid fiber coaxial (HFC) network constructed with both fiber optical cabling and coaxial cable. Network carriers and their equipment providers have adopted industry standards in order to increase interchangeability and reduce manufacturing costs for network hardware. For example, DOC Carriers have adopted industry standards such as the Data Over Cable Service Interface Specification (DOCSIS). DOCSIS version 1.0 was issued in 1997 with hardware devices being certified starting in 1999. DOCSIS version 1.1 replaced version 1.0 in 1999-2001 and now accounts for the bulk of installed DOC network equipment.

FIG. 1 illustrates an example of such a typical DOCSIS-compliant network. Data packets are transmitted in a downstream direction from a cable modem termination system (CMTS) 21, which is located in headend 31 (or distribution hub) of a Carrier, over a coaxial cable 22 to respective cable modems (CMs) 14 of subscriber local networks. CMs may attach a single terminal means to the DOCSIS-compliant network or may further comprise electronics that function as a network hub (e.g. Ethernet hub) or router function. Cable modems may incorporate "firewall" software that is used to block undesirable accesses to the attached local network.

All of CMs 14 are attached by the coaxial cable 22 to the CMTS 21 in an inverted tree configuration, and each CM 14 connected to the coaxial cable 22 listens to all broadcasts from the CMTS 21 transmitted through the coaxial cable 22 for data packets addressed to it, and ignores all other data packets addressed to other CMs 14.

Theoretically, a CM 14 is capable of receiving data in the downstream direction over a 6 MHz channel with a maximum connection speed of 30-40 Mbps. Data packets also are transmitted in the upstream direction over a 2 MHz channel by the CMs 14 to the CMTS 21 typically using time division multiplexing (TDM) and at a maximum connection speed of 1.5-10 Mbps (up to 30 Mbps when DOCSIS version 2.0 is available)

The headend 31 in the DOCSIS Network includes a plurality of CMTSs, with each CMTS supporting multiple groups of CMs each connected together by a respective coaxial cable. Each such group of CMs connected to a CMTS defines a Shared Access Carrier Network, with the coaxial cable in each representing the shared communications medium.

Data transmission over a DOCSIS network can be thought of as a downstream data path and an upstream data path. Downstream paths normally refer to transmission from a web server to a terminal means, for example a terminal 11 or personal computer 12. Upstream data transmission is the opposite with data originating in terminal 11 or personal computer 12.

For purposes of this invention, customer premises equipment 20 includes the cable modems 14, terminals 11, personal computers 12 and related interconnections, power sources, etc.

FIG. 2 illustrates a cable network for a single cable modem hub 19. Such configurations have become particularly popular recently and include both wired and wireless (short distance FM) connections to terminal means. Characteristics of a DOCSIS compatible network include two-way transmission, a maximum 100-mile distance between the farthest cable modem and the cable modem termination system, and the coexistence with other services on the cable network.

Users of cable networks subscribe with the DOC carrier and select from various pricing arrangements for use of the network. For example, users may agree to a flat fee per month, flat fee per month by quality of service or maximum bandwidth provided, a charge for the amount of data transferred, a combination of data transfer charge and flat fee, etc. Although each pricing method has advantages and disadvantages, the data transfer charges are often preferred as more closely assessing costs of high data transfer to the consuming user. As a result, low data users can enjoy high speed Internet access without being penalized or subsidizing use by high data users. As used herein, "subscriber" refers to a user that has entered into a contractual relationship with a DOC carrier.

As used herein "consumption based billing" refers to DOC carriers applying data transfer charges to the account of cable network users. When implementing consumption based billing, the DOC carrier makes use of data transfer counters present in the CMTS. One or two counters are used for each cable modem attached to a particular CMTS. All data traffic through the CMTS to or from a particular cable modem is counted and charged to the user assigned that cable modem.

DOC carriers prefer consumption based billing as a method of avoiding placing data traffic limits on all subscribers. Instead of restricting high data subscribers (often after the fact), each subscriber is responsible to restrict their amount of data transfer or pay a higher invoice. The DOC carrier thus avoids having to monitor and police high data subscribers. Further, subscribers obtaining higher data throughput by modifying their cable modem or bypassing initialization settings are charged for the higher use even when the DOC carrier is not notified of the changes. With consumption based billing, subscribers are thus provided with an economic incentive to restrict the amount of data transfer.

Subscribers choosing to restrict the amount and type of data transfer to or from the Internet implement various filtering and blocking software algorithms (collectively "subscriber filtering"). These software algorithms include software operating in the CPE devices. For example, the cable modem hub may incorporate firewall software. Other software may run on terminal means and include computer-based firewalls, virus detection software, Spam blocking, restrictions to various "adult" Internet data, and the like.

Another example of subscriber filtering is software in the category of "stateful packet" filtering. U.S. Pat. No. 6,141,749 to Coss et al. describes the use of stateful packet filtering in computer firewalls. In general stateful packet filtering attempts to allow subscriber initiated Internet access while blocking non-subscriber initiated access, for example those from individuals attempting unauthorized access to CPE devices and data (i.e. hackers).

One impediment to subscriber acceptance of consumption based billing is that subscriber filtering occurs at the CPE location. Before subscriber filtering can block an undesired data transfer packet, it must first receive the data at a filtering location under subscriber control. With existing subscriber filtering this occurs in the firewall of the cable modem hub or in the terminal or computer means.

However, the subscriber is billed for all data transfer between the cable modem termination system (CMTS) and the cable modem hub, including data that is blocked or filtered by the subscriber. As a result subscribers are charged for data transfers that are unwanted and further beyond subscriber control. Hackers can target subscribers of a particular DOC carrier and create discontent by inflating consumption charges. While subscribers are normally receptive to consumption based billing, they are not receptive to paying for undesired or unwanted data traffic they are unable to prevent.

Thus it is desirable that a system and method be provided by DOC carriers that eliminate subscribers being charged for undesired or unwanted data traffic in a consumption based billing environment. As is demonstrated below, applicants have developed such a system and method that has additional benefits of reducing cable network load factors.

BRIEF SUMMARY OF THE INVENTION

The invention is an application and method designed to reduce or eliminate unauthorized network traffic in a cable data network with consumption based billing. The cable modem termination system (CMTS) filters and blocks data traffic not authorized by subscribers thereby eliminating consumption based charges associated with unwanted network traffic or network intrusions. The consumption based subscriber authorization settings and policies are enforced by a CMTS data gateway agent.

Market acceptance of consumption based billing is enhanced as subscribers are charged only for data traffic conforming to their settings. Separate methods are incorporated to provide static and dynamic editing of subscriber data filter settings.

Various embodiments of the invention incorporate differing methods to block or allow network traffic and include packet filtering, hybrid stateful packet filtering, content screening algorithms, application layer data filtering and time based filtering. The methods of the present invention further incorporate subscriber directed filtering of PacketCable™ data packets. Preferred methods and embodiments are compatible with DOCSIS specifications versions 1.0, 1.1 and 2.0.

BRIEF DESCRIPTION OF THE DRAWINGS

FIG. 9 illustrates one embodiment of a Data Transfer Settings entry screen;

FIG. 10 illustrates one embodiment of a URL Filtering Categories selection entry screen;

FIG. 11 illustrates one embodiment of a URL Filtering Algorithm selection entry screen; and FIG. 12 illustrates one embodiment of a Time Control Filtering selection entry screen.

DETAILED DESCRIPTION OF THE INVENTION

The present invention relates to methods of enhancing cable Internet subscriber satisfaction by enforcing subscriber data transfer filtering requests at the DOC carrier headend in a consumption based billing environment. The DOC carrier provides a cable modem termination system gateway agent (CMTS gateway agent) that controls data transfers through a cable modem termination system based upon subscriber authorization selections. In preferred embodiments, the subscriber authorization selections are transmitted to the CMTS gateway agent in an encrypted or secure transmission packet.

DOC carriers may offer data over cable services on a "consumption based billing" basis. Subscribers to such services are charged or surcharged for the amount of data transfer between subscriber cable modem (or cable modem hub) and the DOC carrier cable modem termination system (CMTS). As used herein, "consumption based billing" refers to charging subscribers by any of the following methods: 1) calculating charge by applying a rate structure against total data transfer; 2) calculating charge as a basic service connection fee plus a surcharge calculated by applying a rate structure against total data transfer; 3) calculating charge as a basic service connection fee that includes a built-in allowance for data transfer plus a surcharge calculated by applying a rate structure against total data transfer exceeding the allowance; 4) calculating charge as a basic service connection fee for each terminal means connected plus a surcharge calculated by applying a rate structure against total data transfer; 5) calculating charge as a basic service connection fee for each terminal means connected that includes a built-in allowance for data transfer plus a surcharge calculated by applying a rate structure against total data transfer exceeding the allowance; or combinations of the above.

Rate structures may be a flat fee per bytes of data transfer or a varying rate structure. For example, a varying rate structure can depend upon the number of bytes of data transfer, or vary by type of data service flow (e.g. upstream data charged differently than downstream data, or data with certain transport characteristics such as low latency). When using a varying rate structure, a DOC carrier may use an equation to calculate the rate or a look-up table. Rate structures may further vary by contractual discounts negotiated, or type of service account (e.g. residential, business, base service, premium service, Voice over Internet Protocol (VoIP) enabled, etc.).

Figure 1:
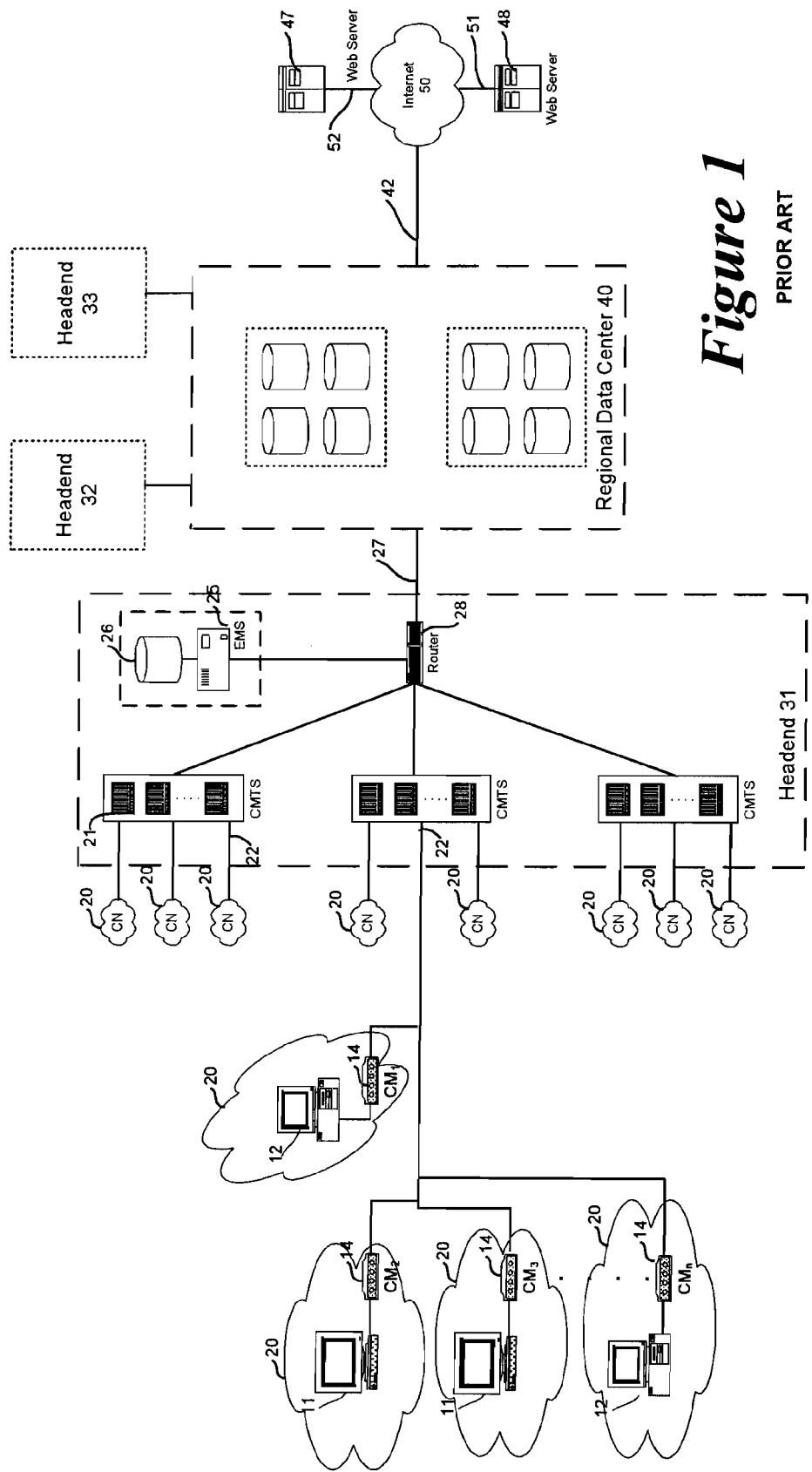
FIG. 1 illustrates a typical network as known in the art and using cable network connectivity.
Figure 2:
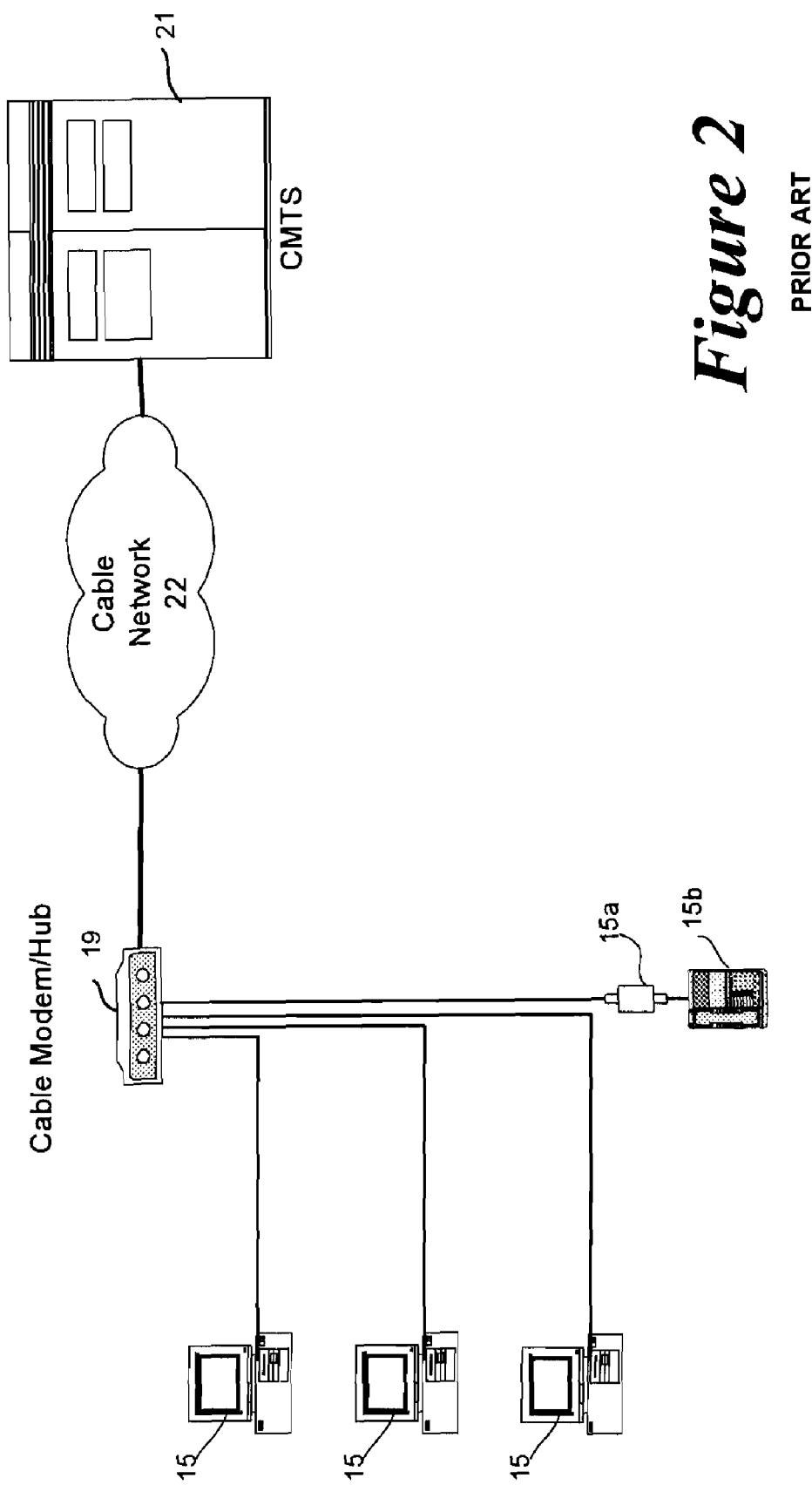
FIG. 2 is a simplified schematic illustrating a combined cable modem/hub.
Figure 3A:
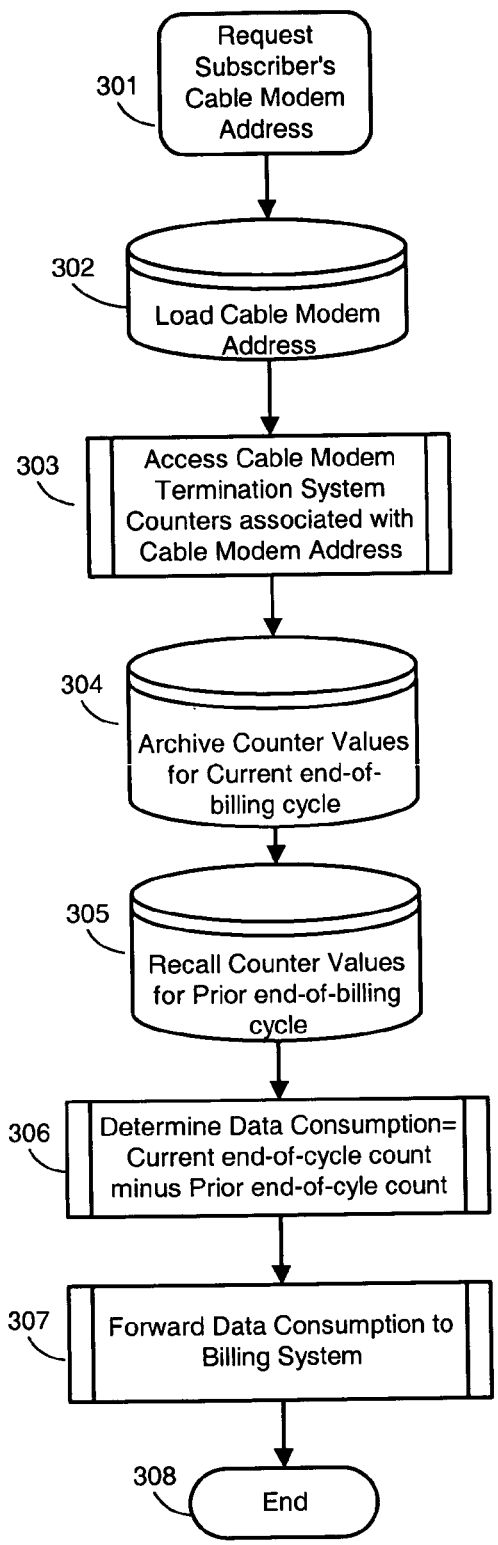
FIG. 3A illustrates a flow diagram of determining amount of data transfer for a subscriber using cable modem termination system counters.

When implementing consumption based billing, the DOC carrier makes use of data transfer counters present in the CMTS. FIG. 3A illustrates how a DOC carrier may use such counters. The DOC carrier requests the subscriber's cable modem address 301 and retrieves the address from a data table 302. Normally the modem address is the modem's media access control (MAC) address. The CMTS maintains current data transfer counts for each connected cable modem. The current values associated with the cable modem are accessed 303 and archived as Current end-of-billing cycle values 304. In preparation for subscriber billing, prior end-of-billing cycle values are recalled 305 and the period data transfer consumption determined by difference 306, with the result forwarded to subscriber billing system 307.

Included in the method of FIG. 3A is the use of running counters in the CMTS. Other variations are possible, depending upon the desires of the DOC carrier. For example, instead of relying upon running counters, the counters could be reset after the current values are archived 304. The advantage of resetting counters is that billing periodic-to-date counter values are directly accessed, without the need for the difference step 306. The CMTS may also be utilized to provide running counters along with reset-able counters.

Figure 3B:
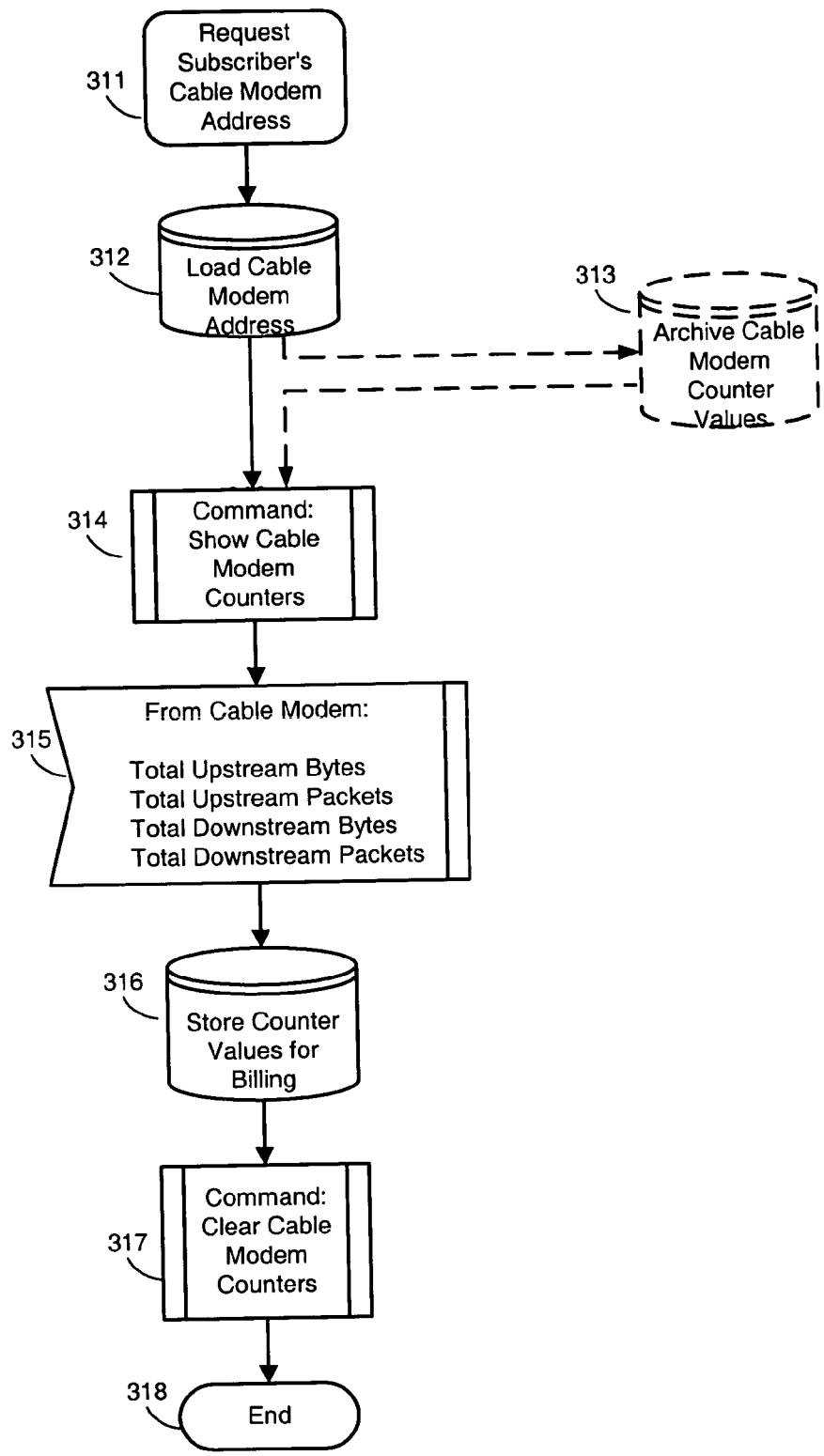
FIG. 3B illustrates a flow diagram of determining amount of data transfer for a subscriber using cable modem counters.

Other examples utilize data transfer counters resident in the cable modem. FIG. 3B. The example of FIG. 3B starts with requests for the subscriber's cable modem address 311 and retrieval of the address from a data table 312. A simple network management protocol (SNMP) command such as "show cable modem counters" is then transmitted to the appropriate cable modem 314. Optionally, the prior values of the cable modem counters can be archived 313 prior to transmitting the command. Archives are useful for data recovery in the event a failure occurs during the counter retrieval process.

Having received the SNMP command (e.g. show counters) 314, the subscriber's cable modem responds with current values of data transfer counters 315. Counters include total number of packets and bytes for both upload and download data transfers (i.e. four counters). The values are received by the CMTS and stored for subscriber billing 316. The counters may be reset to zero using a clear cable modem counters command 317. The counter retrieval process for the particular subscriber ends 318 and the process is then repeated for additional subscribers. As an alternate, the counters are not reset and current billing cycle data consumption is determined by difference.

Although FIG. 3B uses SNMP commands, "show cable modem counters" and "clear cable modem counters", other SNMP commands may be used. For example, the command "show cable modem verbose" will return counter values along with other cable modem parameters. Similarly, other commands may be used to reset cable modem counters. The use of CMTS commands will often permit identifying a cable modem by its MAC address or its current assigned Internet Protocol address.

CBB subscriber data transfer filtering occurs according to the data transfer settings stored for in the data transfer gateway agent. For each attached cable modem (CM), a subscriber having administrator privilege is established. The subscriber administrator is then permitted to edit data transfer settings or accept "default" setting.

The subscriber with administrator privilege is normally the individual having spending authority over Internet expenses. In this manner, the individual responsible for CBB costs can control those costs by using more restrictive data transfer settings. When less restrictive settings are desired, the administrator is responsible for the greater data transfer as well as the higher consumption costs.

Data transfer filtering settings for some embodiments of the present invention can be grouped into: filtering rules based upon the Internet communication protocols; filter rules based upon data contents; and a few special filtering rule options. The Internet data transfers occur in the form of data packets. Each data packet is encapsulated (i.e. enclosed with a header and ending) according to the protocols of the Internet hierarchy of communication. These encapsulations provide the first group of filtering options.

Figure 4:
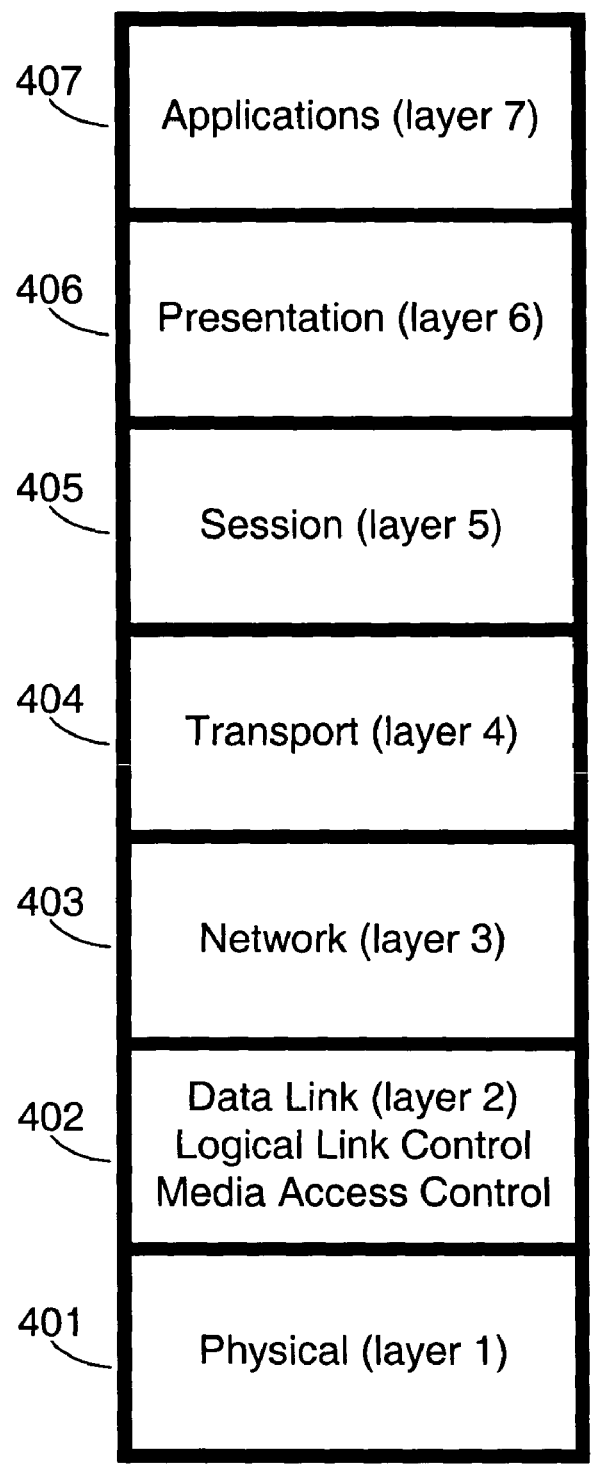
FIG. 4 illustrates the Open Systems Interconnection Reference Model.

The Internet relies upon various standardized network communication protocols and standards. The Open Systems Interconnection Reference Model (OSI Model) was established by the International Standards Organization and is presented in FIG. 4. The OSI Model is hierarchical, with each "layer" functionally designated. Data packet transfer begins in uppermost Applications layer 407 of a sending device. Application layer 407 passes the data packet to Presentation layer 406 where an additional header is added to the data packet. Presentation layer 407 passes the data packet down the hierarchy with each layer adding its header until Physical layer 401 receives the data packet. Packet layer 401 merges the packet onto the network physical communication medium and the data continues toward the destination.

At the destination, the packets move up the OSI Model hierarchy. Physical layer 401 at the destination retrieves the data packet (with its headers) from the communication medium and passes it to Data Link layer 402. Receiving Data Link layer 402 examines the header that was added by sending Data Link layer 402. If the header does not match the destination Data Link layer address, the data packet is discarded. If the sending Data Link layer header does match, then receiving Data Link layer 402 strips off the data link layer header and forwards the packet to receiving Network layer 403. The layer steps are then repeated as the data packet is passed up the hierarchy to reach receiving Applications layer 407. In this manner, each layer of the sending device communicates with the same layer of the receiving device (i.e. peer-layer communication).

Applications layer 407 provides a means for application programs to access the system interconnection facilities. Application layer 407 considers data traffic as either being a sending message or a receiving message and avoids any of the details related to how the message gets from the sending device to the receiving device.

Presentation layer 406 formats data so that it is properly recognized by the receiving device. Translation services are provided, for example, between a transfer syntax and a local concrete syntax.

Session layer 405 is responsible for establishing connections and releasing them upon completion. It manages three types of "dialogs" between application programs. For example the dialog may allow two-way simultaneous interaction (both programs can send and receive data concurrently); two-way alternate interaction (programs take turns sending and receiving); or one-way interaction (one program sends, with other program receiving).

Transport layer 404 builds on the services of the lower layers to ensure reliable data transfers. For example, Transport layer 404 provides flow control, acknowledgments and retransmission of data when necessary. Transport layer 404 may also control the rate at which data transfer occurs to prevent network congestion.

Network layer 403 focuses upon making routing decisions and relaying data between devices. For example, it adds the appropriate network addresses to data packets.

Data Link layer 402 is responsible for providing data transmission over a single connection from one system to another. Control mechanisms in Data Link layer 402 handle the transmission of frames over a physical circuit. This layer also controls how data is organized into "frames". It commonly adds the media access control (MAC) address to data packets.

Physical layer 401 is responsible for the actual transmission of data across a physical circuit. It allows signals (e.g. electrical, optical, RF) to be exchanged between communicating devices.

Figure 5:
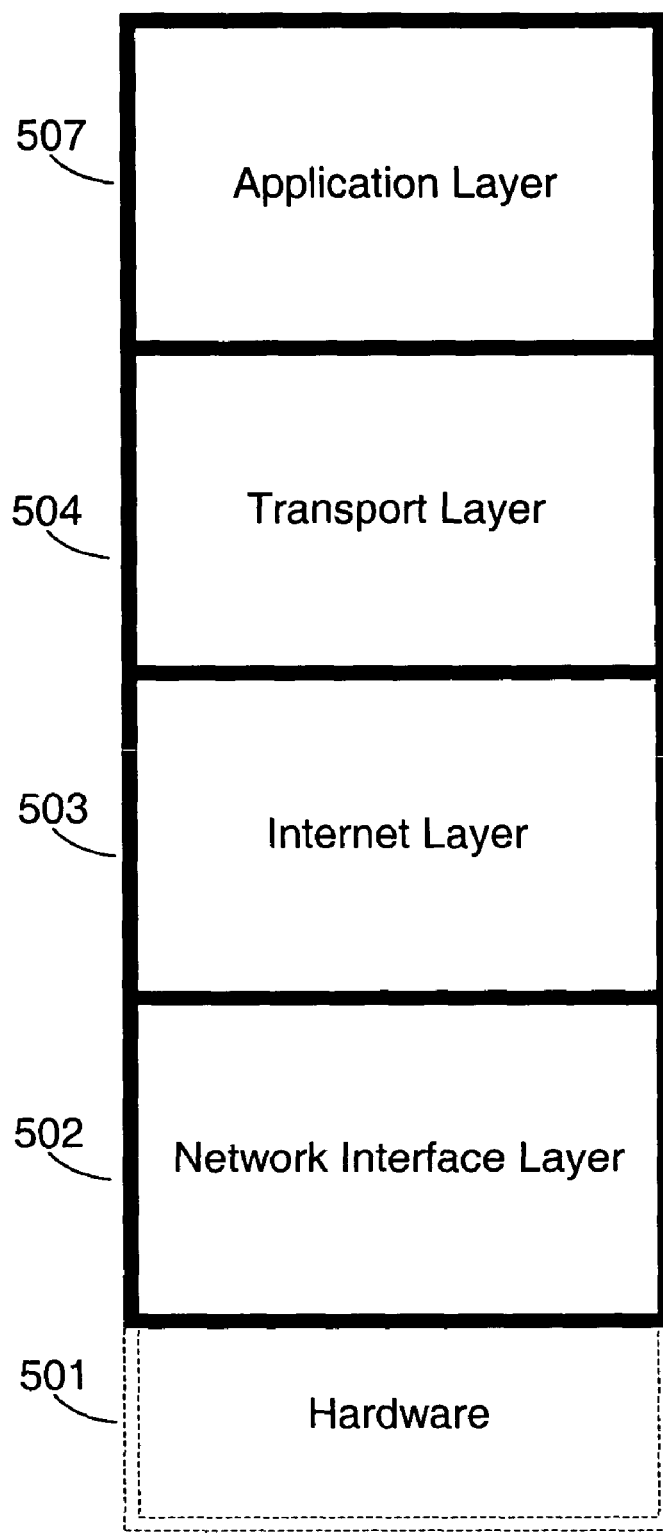
FIG. 5 illustrates the Department of Defense communications network model (also known as TCP/IP model)

In addition to the OSI Model for network communications, the Department of Defense Model (DoD Model) established a network communications model that is illustrated in FIG. 5. The DoD Model identifies four conceptual layers that build on Hardware layer 501. These layers are somewhat different than the OSI Model layers but can be related to OSI Model layers.

Network Interface Layer 502 of FIG. 5 is similar conceptually to OSI Model Physical layer 401 and Data Link layer 402. Similarly, Internet layer 503 approximates Network layer 403, DoD Transport layer 504 approximates OSI Model Transport layer 404 and DoD Application layer 507 approximates the combined functions of OSI Session layer 405, Presentation layer 406 and Application layer 407.

Network Interface layer 502 monitors the data transfer between a communication device and the network. It adds data packet header information relating to hardware addresses and defines protocols for the physical transmission of data. Examples of transmission protocols include Ethernet, fast Ethernet, token ring and fiber distributed data interface (FDDI). Examples of hardware addresses include cable modem media access address (MAC) and network interface card (NIC) addresses.

Internet layer 503 contains the protocols responsible for addressing and routing of data packets. Internet layer 503 includes the multiple protocols such as Internet Protocol (IP) and addressing (IP address), Address Resolution Protocol (ARP), Reverse Address Resolution Protocol (RARP), Inverse Address Resolution Protocol (InARP), Dynamic Address Resolution Protocol (DARP), Internet Protocol version 6 (IPv6) and proposed Internet Protocol version 7 (TP/IX). IP addresses vary with the version of IP, but most commonly have a network address in the form of "nnn.nnn.nnn.nnn" and a similar subnet mask.

One approach to data transfer settings in a consumption based billing environment is to make use of the distinct protocols of Internet layer 503. Such data transfer settings would be to allow or deny data depending upon which protocol is designated. For example, IP data could be allowed and RARP data blocked. However, such blocking data transfer of non-IP protocols is not always desirable. Often times, ARP and RARP are required by downstream Internet routing so that blocking such data packets could be problematic.

Instead of filtering according to types of Internet layer data, it is preferable to perform filtering based on the contents of the Internet layer. Specifically, the 32 bit source address and destination addresses of the Internet layer are used.

In a consumption based billing environment of the present invention, a cable modem termination system (CMTS) counts data transfers either destined to or sourced from a particular cable modem. CMTS will normally also restrict data transfers by requiring data packets to have an address matching one of the cable modems on a cable segment. Most models of CMTS currently in use have this type of "basic" data filtering.

In order to restrict Internet sites visited and prevent unwanted intrusions, cable CBB subscribers may utilize firewalls to filter data passing from cable modem. Firewalls may review the destination and source addresses to see if they are on a designated "allow" or "deny" list. This traditional firewall functionality is provided within the CPE boundary and within control of the CBB subscriber. In large organizations, additional firewall functions may be provided within CPE devices extended to a virtual private network (VPN).

In contrast to CPE device based firewall filtering, the present invention performs Internet address filtering at the CMTS that is under the control and operation of the DOC carrier. CBB subscribers direct the CMTS filtering of data transfers that affect their consumption billing. In addition, other filtering is controlled by the DOC carrier to protect cable network resources and prevent Internet abuses.

Returning to the network model of FIG. 5, the next higher layer is Transport layer 504. This layer shields upper-layer applications from complexities of the network. In most instances transport layer 504 will either be Transmission Control Protocol (TCP) or User Datagram Protocol (UDP). Table 1 indicates a more complete listing of transport protocols, as designated by the Internet Assigned Numbers Authority. As is apparent from Table 1, many different transport layer protocols are in use, yet all are separable according to the IP Protocol Number designator field.

TABLE 1

Transport Layer Protocols with IP designation

| IP Protocol Number | Keyword | Description |
| --- | --- | --- |
| 51 | AH | Authentication Header for IPv6 |
| 93 | AX.25 | AX.25 Frames |
| 7 | CBT | CBT |
| 8 | EGP | Exterior Gateway Protocol |
| 50 | ESP | Encap Security Payload for IPv |
| 3 | GGP | Gateway-to-Gateway |
| 47 | GRE | General Routing Encapsulation |
| 20 | HMP | Host Monitoring |
| 1 | ICMP | Internet Control Message |
| 35 | IDPR | Inter-Domain Policy Routing Protocol |
| 38 | IDPR-CMTP | IDPR Control Message Transport |
| 45 | IDRP | Inter-Domain Routing Protocol |
| 101 | IFMP | Ipsilon Flow Management Protocol |
| 2 | IGMP | Internet Group Management |
| 4 | IP | IP in IP (encapsulation) |
| 67 | IPPC | Internet Pluribus Packet Core |
| 44 | IPv6-Frag | Fragment Header for IPv6 |
| 58 | IPv6-ICMP | ICMP for IPv6 |
| 28 | IRTP | Internet Reliable Transaction |
| 80 | ISO-IP | ISO Internet Protocol |
| 55 | MOBILE | IP Mobility |
| 92 | MTP | Multicast Transport Protocol |
| 54 | NARP | NBMA Address Resolution Protoc |
| 30 | NETBLT | Bulk Data Transfer Protocol |
| 11 | NVP-II | Network Voice Protocol |
| 89 | OSPFIGP | OSPFIGP |
| 113 | PGM | PGM Reliable Transport Protocol |
| 103 | PIM | Protocol Independent Multicast |
| 123 | PTP | Performance Transparency Protocol |
| 27 | RDP | Reliable Data Protocol |
| 46 | RSVP | Reservation Protocol |
| 132 | SCTP | Stream Control Transmission Protocol |
| 42 | SDRP | Source Demand Routing Protocol |
| 57 | SKIP | Simple Key Management for IP |
| 5 | ST | Stream |
| 6 | TCP | Transmission Control |
| 17 | UDP | User Datagram |
| 81 | VMTP | Versatile Message Transaction Protocol |
| 112 | VRRP | Virtual Router Redundancy Protocol |

Of the transport layer protocols listed in Table 1, by far the largest amount of Internet data transfers use either TCP or UDP. Recently, Streaming Control Transmission Protocol (SCTP) is also attaining high usage. TCP protocol provides connection-oriented data transfer with acknowledgments. It uses a data packet header comprising source port, destination port, sequence number, acknowledgment number, data offset, checksum, urgent pointer, options and padding. TCP takes large blocks of data from an application and breaks them into segments. It numbers and sequences each segment sot that the destination's TCP can put the segments back into the order that the application intended. After these data segments are sent, TCP on the sending device waits for an acknowledgment and retransmits segments not acknowledged.

In contrast to TCP, user datagram protocol (UDP) provides connectionless data transfer without acknowledgment. As a result the UDP data packet header is reduced to source port, destination port, length and checksum. UDP is often preferred when the application provides its own data transmission reliability methods. For example, Network File System (NFS) uses UDP and provides its own method of ensuring reliable data transfers.

SCTP protocol transports public switched telephone network (PSTN) signaling messages over IP networks (e.g. VoIP), as well as being used for broader applications. SCTP is a reliable transport protocol operating on top of a connectionless packet network such as IP. It offers the following services to its subscribers: acknowledged error-free non-duplicated transfer of subscriber data; data fragmentation to conform to discovered path maximum transmission unit (MTU) size; sequenced delivery of subscriber messages within multiple streams; optional order-of-arrival delivery of individual subscriber messages; optional bundling of multiple subscriber messages into a single SCTP packet; and multi-homing at either or both ends of an association.

Data filtering can be implemented based upon the transport layer protocol identifier. CBB subscribers can decide to allow, deny or restrict data packets based on their transport layer protocol identifier. For example, a subscriber may determine they have no need for GRE encapsulated packets that are often indicative of peer-to-peer or Internet connections between separate private networks. Similarly, a subscriber may filter out host monitoring (HM) to eliminate unwanted host polling or filter out SCTP traffic when voice over Internet will not be used.

Above transport layer 504 in the network model is application layer 507. In general, application layer 507 is where requests for data or services are processed. Each application layer 507 protocol is assigned a software "port" number. The Internet Assigned Numbers Authority (IANA) maintains a central database of port assignments (available at www.iana.org/assignments/protocol-numbers). A total of 65,536 ports are available for application layer protocols. An extension of the ports concept is the Internet "sockets." Under TCP/IP protocol, application layer 507 creates "sockets" consisting of the IP address, TCP or UDP designator and port number.

Port number assignments are grouped into "Well Known Ports" (0 through 1023), "Registered Ports" (1024 through 49151) and dynamic or private ports (49152 through 65535). Table 2 identifies examples of Well Known Ports and Table 3 identifies examples of Registered Ports. Normally the IANA assigns the port number as both a UDP port and as a TCP port, regardless of whether both port forms will be used. For example, ports 20, 21 (FTP) and 80 (HTTP) are normally only used as TCP ports but are also assigned as UTP ports. Similarly, ports 69 (TFTP) and 161 (SNMP) are normally only used as UDP ports but are also assigned as TCP ports.

TABLE 2

Well Known TCP/IP and UDP/IP Port Assignments

| Keyword | Number/ Protocol | Description |
| --- | --- | --- |
| msp | 18/tcp | Message Send Protocol |
| msp | 18/udp | Message Send Protocol |
| ftp-data | 20/tcp | File Transfer [Default Data] |
| ftp-data | 20/udp | File Transfer [Default Data] |
| ftp | 21/tcp | File Transfer [Control] |
| ftp | 21/udp | File Transfer [Control] |
| ssh | 22/tcp | SSH Remote Login Protocol |
| ssh | 22/udp | SSH Remote Login Protocol |
| telnet | 23/tcp | Telnet |
| telnet | 23/udp | Telnet |
| smtp | 25/tcp | Simple Mail Transfer |
| smtp | 25/udp | Simple Mail Transfer |
| domain | 53/tcp | Domain Name Server |
| domain | 53/udp | Domain Name Server |
| bootps | 67/tcp | Bootstrap Protocol Server |
| bootps | 67/udp | Bootstrap Protocol Server |

TABLE 2-continued

Well Known TCP/IP and UDP/IP Port Assignments

| Keyword | Number/Protocol | Description |
|---|---|---|
| bootpc | 68/tcp | Bootstrap Protocol Client |
| bootpc | 68/udp | Bootstrap Protocol Client |
| tftp | 69/tcp | Trivial File Transfer |
| tftp | 69/udp | Trivial File Transfer |
| gopher | 70/tcp | Gopher |
| gopher | 70/udp | Gopher |
| http | 80/tcp | World Wide Web HTTP |
| http | 80/udp | World Wide Web HTTP |
| xfer | 82/tcp | XFER Utility |
| xfer | 82/udp | XFER Utility |
| ctf | 84/tcp | Common Trace Facility |
| ctf | 84/udp | Common Trace Facility |
| | 106/tcp | Unauthorized use by insecure poppassd protocol |
| rtelnet | 107/tcp | Remote Telnet Service |
| rtelnet | 107/udp | Remote Telnet Service |
| snagas | 108/tcp | SNA Gateway Access Server |
| snagas | 108/udp | SNA Gateway Access Server |
| pop2 | 109/tcp | Post Office Protocol - Vers. 2 |
| pop2 | 109/udp | Post Office Protocol - Vers. 2 |
| pop3 | 110/tcp | Post Office Protocol - Vers. 3 |
| pop3 | 110/udp | Post Office Protocol - Vers. 2 |
| audionews | 114/tcp | Post Office Protocol - Vers. 3 |
| audionews | 114/udp | Audio News Multicast |
| sftp | 115/tcp | Simple File Transfer Protocol |
| sftp | 115/udp | Simple File Transfer Protocol |
| nntp | 119/tcp | Network News Transfer Protocol |
| nntp | 119/udp | Network News Transfer Protocol |
| imap | 143/tcp | Internet Message Access Protocol |
| imap | 143/udp | Internet Message Access Protocol |
| bftp | 152/tcp | Background File Transfer Program |
| bftp | 152/udp | Background File Transfer Program |
| sgmp | 153/tcp | Simple Gateway Monitoring Protocol |
| sgmp | 153/udp | Simple Gateway Monitoring Protocol |
| snmp | 161/tcp | Simple Network Management Protocol |
| snmp | 161/udp | Simple Network Management Protocol |
| irc | 194/tcp | Internet Relay Chat Protocol |
| irc | 194/udp | Internet Relay Chat Protocol |
| mftp | 349/tcp | mftp |
| mftp | 349/udp | mftp |
| nnsp | 433/tcp | NNSP |
| nnsp | 433/udp | NNSP |
| mobileip-agent | 434/tcp | MobileIP-Agent |
| mobileip-agent | 434/udp | MobileIP-Agent |
| conference | 531/tcp | chat |
| conference | 531/udp | chat |
| netnews | 532/tcp | readnews |
| netnews | 532/udp | readnews |
| netwall | 533/tcp | netwall for emergency broadcasts |
| netwall | 533/udp | netwall for emergency broadcasts |
| ftp-agent | 574/tcp | FTP Software Agent System |
| ftp-agent | 574/udp | FTP Software Agent System |

Registered port numbers may be used in local networks as private port assignments. However, such use may conflict with the registered port numbers that companies and other users have registered with the Internet Corporation for Assigned Names and Numbers (ICANN). Formerly registration was done with IANA. Registered ports are used by public servers using TCP or UDP as the contact port for unknown users. Examples include Sun's NEO Object Request Broker (port numbers 1047 and 1048) and Shockwave (port number 1626). Table 3 lists many of the registered ports currently in use. Normally registered ports are associated with one of the eight bolded Table 1 transport layer protocols

TABLE 3

Registered Port Assignments

| Keyword | Number/Protocol | Description |
|---|---|---|
| 3com-njack-1 | 5264/tcp | 3Com Network Jack Port 1 |
| 3com-njack-1 | 5264/udp | 3Com Network Jack Port 1 |
| adobeserver-1 | 1102/tcp | ADOBE SERVER 1 |
| adobeserver-1 | 1102/udp | ADOBE SERVER 1 |
| aol | 5190/tcp | America-Online |
| aol | 5190/udp | America-Online |
| brcm-comm-port | 3188/tcp | Broadcom Port |
| brcm-comm-port | 3188/udp | Broadcom Port |
| cncp | 1636/tcp | CableNet Control Protocol |
| cncp | 1636/udp | CableNet Control Protocol |
| cap | 1026/tcp | Calender Access Protocol |
| cap | 1026/udp | Calender Access Protocol |
| cp-cluster | 8116/tcp | Check Point Clustering |
| cp-cluster | 8116/udp | Check Point Clustering |
| cinegrfx-lm | 1743/tcp | Cinema Graphics License |
| cinegrfx-lm | 1743/udp | Cinema Graphics License |
| cisco-net-mgmt | 1741/tcp | Cisco-net-mgmt |
| cisco-net-mgmt | 1741/udp | Cisco-net-mgmt |
| cma | 1050/tcp | CORBA Management Agent |
| cma | 1050/udp | CORBA Management Agent |
| dellwebadmin-1 | 1278/tcp | Dell Web Admin 1 |
| dellwebadmin-1 | 1278/udp | Dell Web Admin 1 |
| dccm | 5679/tcp | Direct Cable Connect Manager |
| dccm | 5679/udp | Direct Cable Connect Manager |
| directplay | 2234/tcp | DirectPlay |
| directplay | 2234/udp | DirectPlay |
| ddt | 1052/tcp | Dynamic DNS Tools |
| ddt | 1052/udp | Dynamic DNS Tools |
| epc | 1267/tcp | eTrust Policy Compliance |
| epc | 1267/udp | eTrust Policy Compliance |
| ecp | 3134/tcp | Extensible Code Protocol |
| ecp | 3134/udp | Extensible Code Protocol |
| femis | 1776/tcp | Federal Emergency Management Info. Sys. |
| femis | 1776/udp | Federal Emergency Management Info. Sys. |
| fpitp | 1045/tcp | Fingerprint Image Transfer Protocol |
| fpitp | 1045/udp | Fingerprint Image Transfer Protocol |
| redstorm_join | 2346/tcp | Game Connection Port |
| redstorm_join | 2346/udp | Game Connection Port |
| ggz | 5688/tcp | GGZ Gaming Zone |
| ggz | 5688/udp | GGZ Gaming Zone |
| gnunet | 2086/tcp | GNUnet |
| gnunet | 2086/udp | GNUnet |
| gnutella-rtr | 6347/tcp | gnutella-rtr |
| gnutella-rtr | 6347/udp | gnutella-rtr |
| gnutella-svc | 6346/tcp | gnutella-svc |
| gnutella-svc | 6346/udp | gnutella-svc |
| hp-server | 5225/tcp | HP Server |
| hp-server | 5225/udp | HP Server |
| http-alt | 8008/tcp | HTTP Alternate |
| http-alt | 8008/udp | HTTP Alternate |
| http-alt | 8080/tcp | HTTP Alternate |
| http-alt | 8080/udp | HTTP Alternate |
| ibm-cics | 1435/tcp | IBM CICS |
| ibm-cics | 1435/udp | IBM CICS |
| ibm-pps | 1376/tcp | IBM Person to Person |
| ibm-pps | 1376/udp | IBM Person to Person |
| ibm_wrless_lan | 1461/tcp | IBM Wireless LAN |
| ibm_wrless_lan | 1461/udp | IBM Wireless LAN |
| iims | 4800/tcp | Icona Instant Messenging |
| iims | 4800/udp | Icona Instant Messenging |
| ischat | 1336/tcp | Instant Service Chat |
| ischat | 1336/udp | Instant Service Chat |
| proshare-mc-1 | 1673/tcp | Intel Proshare Multicast |
| proshare-mc-1 | 1673/udp | Intel Proshare Multicast |
| kazaa | 1214/tcp | KAZAA |
| kazaa | 1214/udp | KAZAA |
| msgsrvr | 8787/tcp | Message Server |
| msgsrvr | 8787/udp | Message Server |
| messageservice | 2311/tcp | Message Service |
| messageservice | 2311/udp | Message Service |

TABLE 3-continued

Registered Port Assignments

| Keyword | Number/Protocol | Description |
| --- | --- | --- |
| opsmgr | 1270/tcp | Microsoft Operations Manager |
| opsmgr | 1270/udp | Microsoft Operations Manager |
| wins | 1512/tcp | Microsoft's Windows Internet Name Service |
| wins | 1512/udp | Microsoft's Windows Internet Name Service |
| msfw-control | 3847/tcp | MS Firewall Control |
| msfw-control | 3847/udp | MS Firewall Control |
| mdns | 5353/tcp | Multicast DNS |
| mdns | 5353/udp | Multicast DNS |
| adapt-sna | 1365/tcp | Network Software Associates |
| adapt-sna | 1365/udp | Network Software Associates |
| ddi-tcp-1 | 8888/tcp | NewsEDGE server TCP 1 |
| ddi-udp-1 | 8888/udp | NewsEDGE server UDP 1 |
| nimgtw | 48003/tcp | Nimbus Gateway |
| nimgtw | 48003/udp | Nimbus Gateway |
| netware-csp | 1366/tcp | Novell NetWare Comm Service |
| netware-csp | 1366/udp | Novell NetWare Comm Service |
| x500ms | 5757/tcp | OpenMail X.500 Directory |
| x500ms | 5757/udp | OpenMail X.500 Directory |
| pdp | 1675/tcp | Pacific Data Products |
| pdp | 1675/udp | Pacific Data Products |
| pc-mta-addrmap | 2246/tcp | PacketCable MTA Addr Map |
| pc-mta-addrmap | 2246/udp | PacketCable MTA Addr Map |
| passwrd-policy | 1333/tcp | Password Policy |
| passwrd-policy | 1333/udp | Password Policy |
| pcanywheredata | 5631/tcp | pcANYWHEREdata |
| pcanywheredata | 5631/udp | pcANYWHEREdata |
| pcanywherestat | 5632/tcp | pcANYWHEREstat |
| pcanywherestat | 5632/udp | pcANYWHEREstat |
| pktcable-cops | 2126/tcp | PktCable-COPS |
| pktcable-cops | 2126/udp | PktCable-COPS |
| pptp | 1723/tcp | Peer-to-peer tunneling protocol |
| pptp | 1723/udp | Peer-to-peer tunneling protocol |
| radio-bc | 1596/udp | radio-be |
| radio-sm | 1596/tcp | radio-sm |
| swa-1 | 9023/tcp | Secure Web Access - 1 |
| swa-1 | 9023/udp | Secure Web Access - 1 |
| sep | 2089/tcp | Security Encapsulation Protocol - SEP |
| sep | 2089/udp | Security Encapsulation Protocol - SEP |
| shockwave2 | 1257/tcp | Shockwave 2 |
| shockwave2 | 1257/udp | Shockwave 2 |
| snap | 4752/tcp | Simple Network Audio Protocol |
| snap | 4752/udp | Simple Network Audio Protocol |
| stvp | 3158/tcp | SmashTV Protocol |
| stvp | 3158/udp | SmashTV Protocol |
| sun-lm | 7588/tcp | Sun License Manager |
| sun-lm | 7588/udp | Sun License Manager |
| tivoconnect | 2190/tcp | TiVoConnect Beacon |
| tivoconnect | 2190/udp | TiVoConnect Beacon |

Data filtering can be implemented based upon application layer 507 protocol identifier. CBB subscribers can decide to allow, deny or restrict data packets according to its identifier. For example, a subscriber may determine they desire to exclude Internet data associated with Distributed Mail Service Protocol (DNSP), Internet Relay Chat Protoco (IRC), Network News Transfer Protocol (NNTP), Internet Mail Access Protocol (IMAP), Post Office Protocol (POP, POP2, POP3), Peer-to-peer tunneling protocol (PPTP), etc.

Data transfer filtering on port numbers will normally use the well known port assignments of Table 2 (in the range of 1-1023) in order to filter categories or types of data traffic. Registered port numbers may also be filtered in order to prevent accidental entry into undesired Internet sites (e.g. upstream data packets) or to prevent non-subscribers from accessing data using an internal port number (e.g. downstream data packets). For example, a home network may be using port 2099 for print routing. By filtering data packets using port 2099, the printing will be secure from external print requests.

Filtering data transfer based upon protocol identifiers and IP addresses are forms of "packet filtering". An example of a subscriber choices using packet filtering is: 1) Allow all outgoing TCP connections; 2) Allow incoming SMTP and DNS to external mail server; and 3) Block all other traffic.

Basic packet filters make decisions about whether to forward a packet based on information found at the IP or TCP/UDP layers. However, such packet filters handle each packet individually. They do not keep track of TCP sessions. As a result, spoofed packets may go undetected. Spoof packets may, for example, come in through Internet-CMTS interface, pretending to be part of an existing session by setting the ACK flag in the TCP header. Packet filters are configured to allow or block traffic according to source and destination IP addresses, source and destination ports, and type of protocol (TCP, UDP, ICMP, and so on).

An improvement over a basic packet filter is the "stateful packet filter." Stateful packet filtering is a method that restricts data transfers based upon the origin of the data packet. In the case of TCP packets, stateful packet filtering detects embedded state information. The first packet of a new connection has its SYN flag set and its ACK flag cleared. Such first packets are used as initiation packets. Packets not having this flag structure are subsequent packets, since they represent data that occurs later in the TCP stream.

When the CMTS receives an Initiation packet as a downstream packet, an outside user is trying to make a connection from the Internet into the CPE network. Under stateful packet filtering, normally such packets are filtered out. Data transfer is restricted by eliminating these packets that do not originate from within the CPE terminal means. For example, downstream initiation packets can be dropped and logged.

When the CMTS receives an initiation packet as an upstream packet, an inside user is trying to make a connection from the CPE network to the Internet. Assuming that the packet contents are otherwise acceptable, the CMTS will allow the connection and create a cache entry that includes connection information such as IP addresses, TCP ports, sequence numbers, etc.

Subsequent packets received by the CMTS have their packet connection information extracted and compared to the cache. A packet is only allowed to pass through if it corresponds to a valid connection (that is, if it is a response to a connection which originated on the CPE network).

Some data packets do not lend themselves to stateful packet filtering as previously described. For example, UDP and ICMP do not contain connection information. Similarly some data packets conforming to upper layers of the OSI Reference model use multiple network connections simultaneously. As used herein "hybrid stateful packet filtering" comprises stateful packet filtering with additional functionality to address these situations.

For example, hybrid stateful packet filtering may handle UDP packets in the following fashion. The filter creates an entry in a connection database when the first UDP packet is transmitted. A UDP packet from a less secure network (a response) will only be accepted if a corresponding entry is found in the connection table.

Another example uses hybrid stateful packet filtering with file transfer protocol (FTP). FTP is different than UDP in that the server a user connects to on port 21 will initiate a data connection back on port 20 when a file download is requested. If the filtering agent does not store information about the FTP control connection during initial connection, it will not allow the data connection back in (via port 20). Similar techniques are needed for many of the newer multimedia protocols such as RealAudio and NetMeeting.

Hybrid stateful packet filtering software is commercially available from companies such as SonicWall, Cisco and Check Point. Such software is under the control of a network administrator or a DOC carrier in charge of the hardware upon which the software operates. In contrast, the present invention uses hybrid stateful packet filtering under the control of the cable subscriber but operating in hardware under the control of the DOC carrier.

In addition to packet filtering, application level 407 filtering is suitable with use of the present invention. Application filters evaluate data packets for valid data at application layer 407 before allowing a connection. The CMTS gateway agent examines all data packets at the application layer and stores connection state and sequencing information. For example, security items such as subscriber password and service requests that appear in the application layer data can be validated by the CMTS gateway agent.

Another important example of application level filtering is universal resource locator (URL) filtering. A URL is the address of a file (resource) accessible on the Internet. The complete URL contains the name of the protocol required to access the resource, a domain name that identifies a specific computer on the Internet, and a hierarchical description of a file location on the computer.

URLs are used instead of IP addresses when accessing Internet data sources. For example, a popular URL is http://www.uspto.gov and designates the home page of the US Patent and Trademark Internet website. URLs are more convenient to use than an IP address such as 12.92.116.135. Further, URLS are often referenced to dynamically assigned IP addresses.

For purposes of URL filtering, normally only the domain name is needed. Due to the large number of URLs that exist, it is convenient to group URLs into categories. FIG. 10 illustrates an exemplary selection screen that allows a data cable subscriber to select URL categories to allow or block. When a URL category is blocked, data packets to or from Internet locations with domain names identified as belonging to that category are blocked.

Preferred URL filtering utilizes a URL database of domain names that are sorted by category. The URL database may be manually updated or automatically updated. Preferably the URL database is automatically updated. Automatic updates may be provided by a subscription service that tracks domain name entries by category. Such subscription services are available from N2H2, Inc. SurfControl, SurfWatch, Cyber-Patrol, LittleBrother, and the like.

As is seen during implementation of the present invention, using of URL databases often leads to desirable URLs being blocked, contrary to data cable subscriber wishes. In response for this need, exception lists are maintained by the DOC carrier for each subscriber account. This feature allows a category of URLs to be allowed or blocked except for URLs noted in allowance exception and disallowance exception lists.

Instead of performing URL filtering by comparing domain names to a database of categories (along with exception lists), an algorithm based content filtering may be performed. Internet documents are scanned for content that meets a particular undesirability criteria and then all data from the related URL is blocked. An example of this method is disclosed in U.S. Pat. No. 6,266,664 to Russell-Fall et al. and commercially available from RuleSpace, Inc. for implementation in subscriber controlled hardware. Preferably, exception lists are also employed with algorithm based filtering as overrides for each subscriber account.

Application level 407 filtering is useful for allowing or blocking peer-to-peer (P2P), instant messaging, and personal information data transfers. P2P networks make use of customer computing platforms to provide virtual servers. The virtual servers act as data repositories that can be easily accessed from non-local terminal means. One popular use of P2P networks is for freely shared file repositories. Popular for these repositories are sharing of music or video programs, including MP3 formatted digital music files.

P2P networks rely upon the virtual server application programs that permit and support file sharing from the external network to a local network connected computing platform. Popular virtual server application programs include KaZaa, Grokster, Morpheus, Gnucleus, BearShare, iMesh, LimeWire, eDonkey, BadBlue, WinMX, AudioGalaxy, Blubster, Filetopia, Net Brillant, Phex, Shareaza, Splooge, Swapper, Swaptor, Wippit and the like.

Many of the P2P networks further encourage users to provide file sharing by including an embedded "participation level." For example, KaZaa users with higher participation levels receive and download files on a faster basis than users with lower participation. The application assigns user participation levels by determining the amount of megabytes of files external users have accessed. As a result, a KaZaa user sharing 10 megabytes will have a lower participation level than a user sharing 10 gigabytes. Furthermore, many P2P users while generally aware of how much data they have downloaded to their computer, they may not be aware of how many public users are connecting to their system transferring files as well.

A more limited use of P2P networks is in webcasting. Although a webcaster could broadcast messages to all receiving customers, such an arrangement would result in the webcaster absorbing all bandwidth charges. Instead the webcaster will use P2P networks, taking advantage of "free" bandwidth provided by cable network customers. Some webcasters have announced saving 60-75% of bandwidth charges by using P2P networks.

Many Internet service providers (ISPs) offer instant messenger applications that transmit messages to identified destinations within a short time period. Instant messenger applications are offered by Microsoft Network (MSN IM), Yahoo (Yahoo Messenger), Road Runner (RR Messenger), America Online (AOL IM), ICQ Messenger, Jabber Messenger and the like. Typical bandwidth usage for instant messaging is modest. However, users may have strong desire to reserve bandwidth for instant messaging on a high priority basis.

Preventing the transmission of personal information is often a high priority with cable data network subscribers. For example an application layer filter may block all data packets containing the telephone number, social security number, drivers' license, credit card number of the subscriber and subscriber's location. In the alternative, such information may be blocked for all but a subscriber with administrator login privileges.

An emerging cable data network use is PacketCable™. The PacketCable™ initiative is sponsored by CableLabs® (a non-profit research and development consortium) and is intended for delivering real-time multimedia services over two-way cable networks. PacketCable™ networks use Internet protocol (IP) technology to enable a wide range of multimedia services, such as IP telephony (VoIP), multimedia conferencing, interactive gaming, and general multimedia applications.

By applying data transfer filters, the present invention also accommodates PacketCable™. For example, unwanted gaming, conferencing and voice communications can be blocked or allowed on either a global (category) or specific basis.

Some preferred embodiments of the data gateway agent of the present invention provide consumption based billing subscribers additional ways to limit data transfer, and in turn, data transfer charges. The data gateway agent may incorporate data consumption triggers. Such triggers are used to automatically take action upon reaching a value of total data transfer. For example, the gateway agent may automatically block additional data traffic in order to limit consumption charges. The agent may also notify the subscriber that data traffic has reached or is approaching levels at which surcharges will begin.

Preferred embodiments of the gateway agent also allow data traffic to be limited to particular periods of time. Time based data blocking is even more preferably combined with other types of data filtering. For example, a parent may wish to restrict instant messaging and online gaming to one hour per day while allowing unlimited access to educational Internet websites.

FIG. 6 through FIG. 11 illustrate how embodiments of the present invention interact with a typical CBB subscriber. These illustrations are provided as examples only and are not to be considered limiting. Features may be combined, eliminated or added to in order to adapt to particular CBB subscriber needs. Common to all embodiments is the use of DOC carrier equipment and devices providing data transfer filtering under the direction of a CBB subscriber. By placing control for data traffic with the subscriber, much greater consumer acceptance of consumption based billing is attained.

Figure 6:
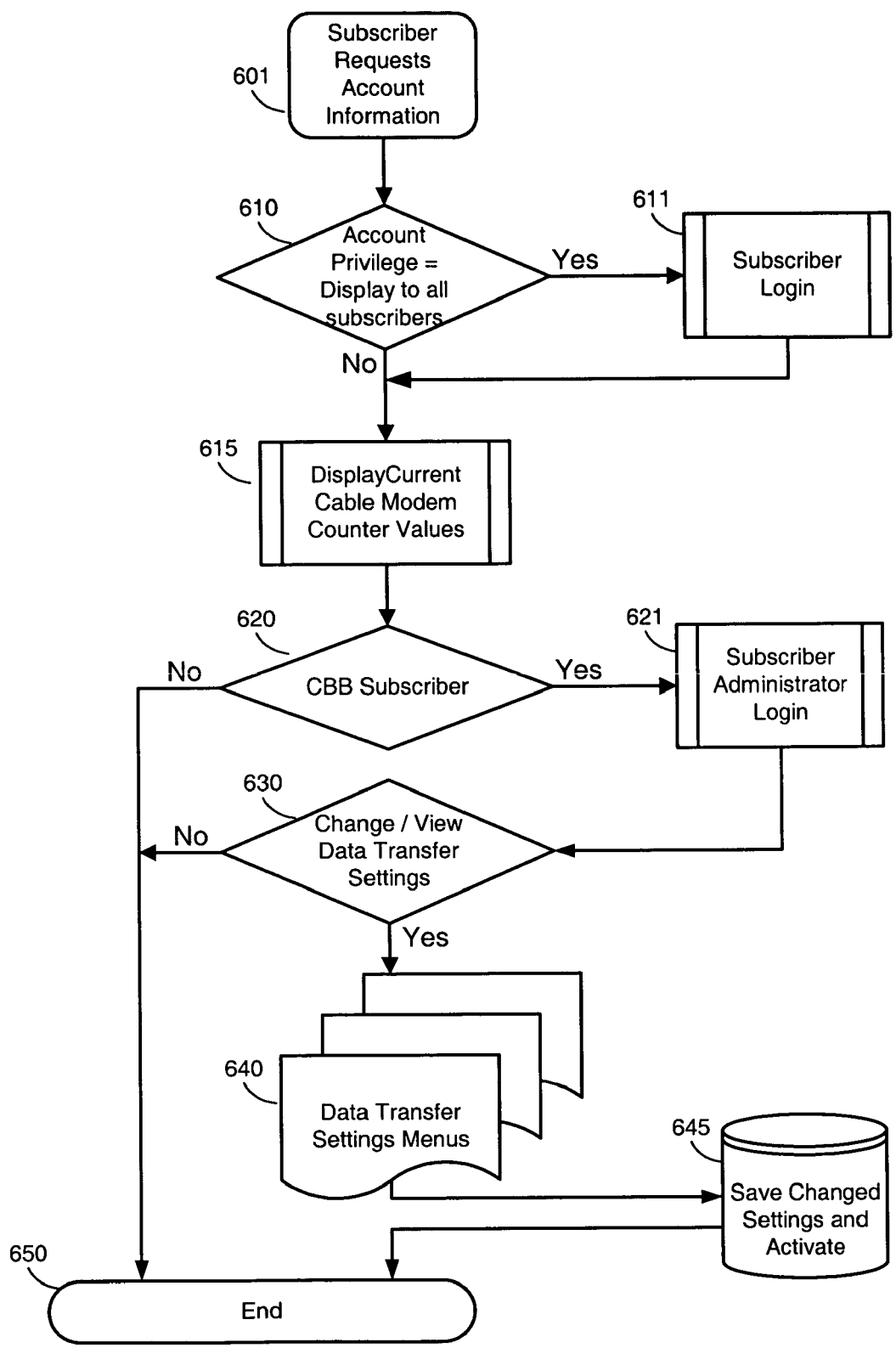
FIG. 6 illustrates a flow diagram of a subscriber entering data transfer settings in a consumption based billing environment.

FIG. 6 illustrates how CBB subscribers configure the data gateway agent for their respective account. CBB subscriber requests account information 601. The data gateway agent checks settings for the account number to see if all subscribers are allowed to see account settings 610. If only a subscriber must have administrator privilege to view the settings, an appropriate login screen is displayed 611. Existing consumption based billing counts are then displayed 615.

The cable modem's MAC address is compared to the one registered for the account 620 and if it does not match the session terminates 650. In a variation, the IP address of the terminal means must also match that registered as the subscriber with administrator privilege. The subscriber is next taken to login process 621 where a password or other identifying method is used to verify that the subscriber has administrator privilege over the account. After login, current account values are displayed 630 and the subscriber may request to change settings 640 or exit 650.

A number of data transfer setting menus 640 are displayed and the subscriber with administrator privilege makes changes. Upon leaving the menus, changed values are stored 645 by the data gateway agent for use in data transfer filtering.

Subscriber administrator login is illustrated in FIG. 6 in order to increase security and further limit data transfer in accordance with subscriber desires. However, subscribers may also configure their account to permit changes from any terminal means connected to the subscribers' cable modem. In this case, administrator login steps are bypassed and the flowchart instead relies upon identification of the cable modem (e.g. from the MAC address).

Preferably, the transmission of subscriber login and data transfer settings to the data transfer gateway agent uses secured data transmissions, as is known in the art. For example, subscriber selections may use 40 bit or 128 bit encryption during transmission of data settings.

Figure 7A:
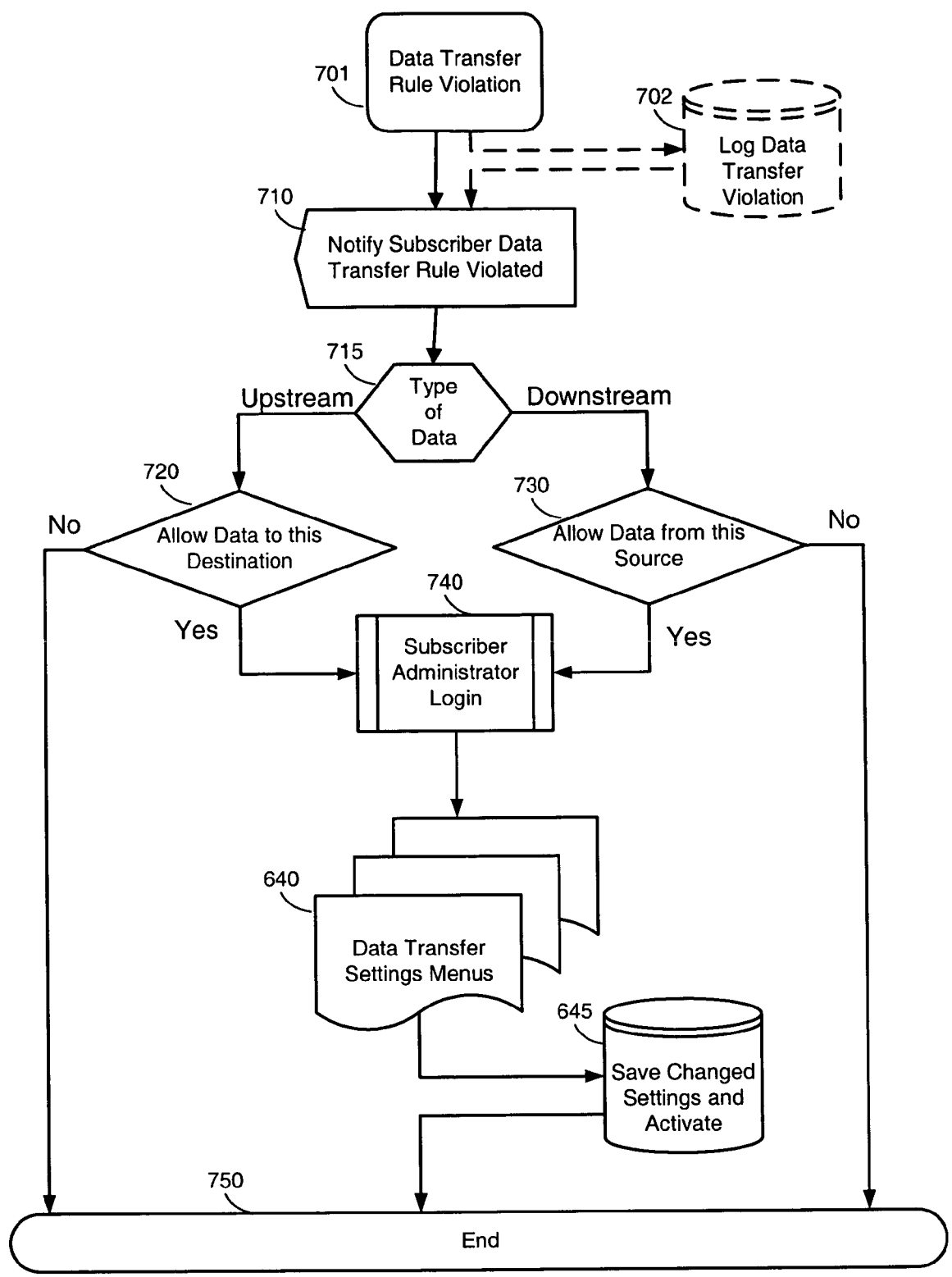
FIG. 7A illustrates a flow diagram of a subscriber changing data transfer settings in a consumption based billing environment in response to a rule violation message.
Figure 7B:
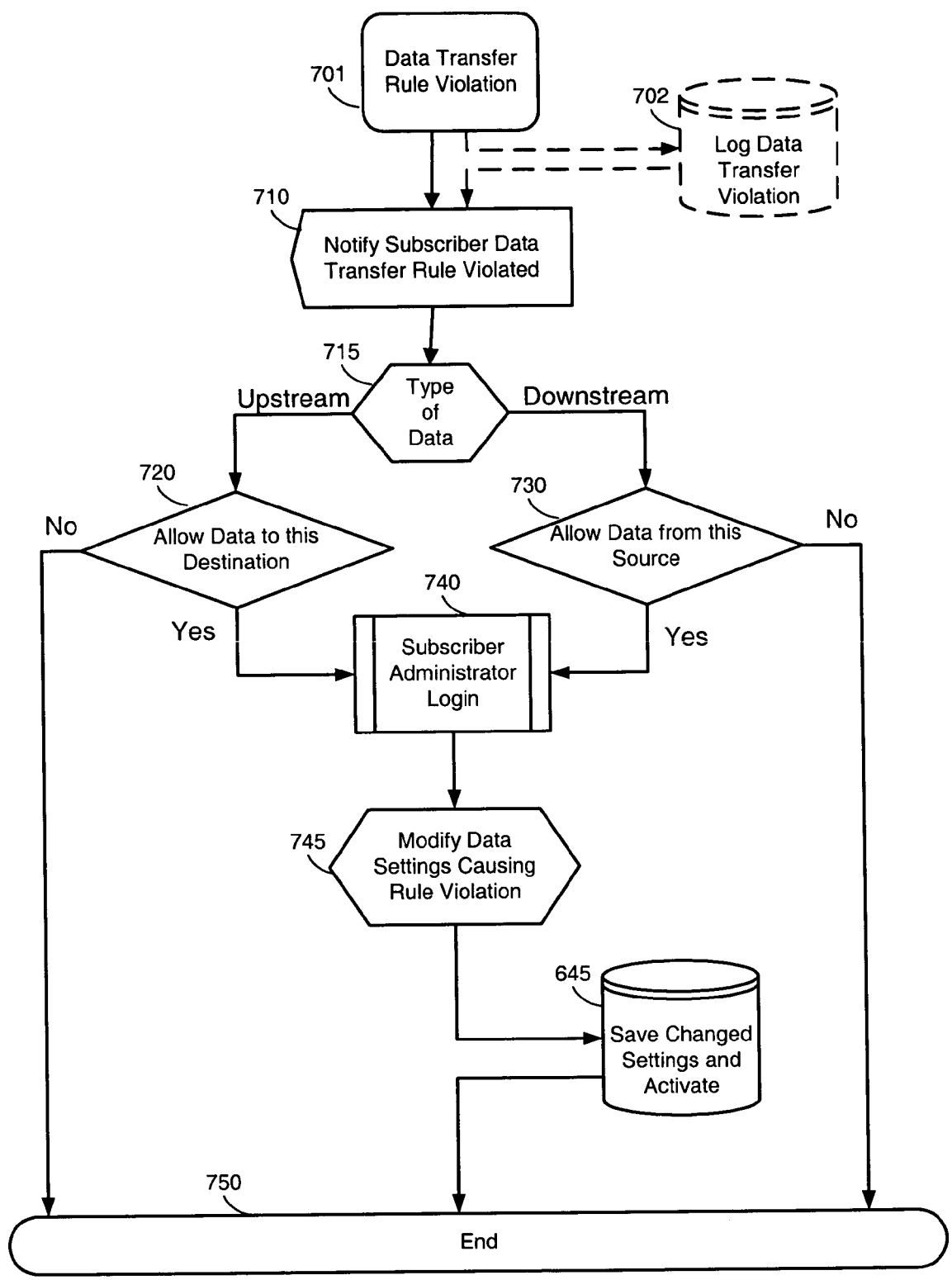
FIG. 7B illustrates a flow diagram of automatic changing data transfer settings in a consumption based billing environment in response to a rule violation message and subsequent to subscriber authorization.

FIG. 7A and FIG. 7B flowsheets illustrate how the data gateway agent responds upon detecting a data transfer rule violation 701. Comparing data packets against data transfer settings a violation is detected 701. Automatically a notification message is transmitted to the subscriber 710 and optionally logged 702. When logged, it is desirable to also log information permitting tracking of the source of the violation and other relevant diagnostic information.

Data violations are initially separated into upstream data and downstream data 715. The subscriber is asked to allow data being sent 720 or received 730. If the data is not allowed, the data packets are discarded and the notification process ends 750.

In FIG. 7A, when subscribers choose to allow the data causing a rule violation they first login with administrator privilege 740, proceed to data transfer settings menus 640, enter appropriate changes, then save and activate the new settings 645.

It has been found that subscribers may be unable to determine which data transfer setting is involved in a given rule violation. The flowsheet of FIG. 7B addresses this difficulty. Once the subscriber has requested the allowance of data causing the rule violation (720 or 730) and entered identification of administrator privilege 740, the data gateway agent then proceeds to automatically adjust the data transfer settings to permit such data 745. Changes to settings are then saved and activated 645.

The flowsheets of FIG. 7A and FIG. 7B begin with the data gateway agent detecting a rule violation 701 and allow for dynamically changing data transfer settings (640 or 745). Another situation may arise in which a subscriber either receives unwanted data (e.g. pop-up ad, Spam, data filter settings wrong, etc.) or arrives at a URL website they want to restrict access to in the future. The flowsheets of FIG. 8A and FIG. 8B accommodate such possibilities beginning with the subscriber identifying unwanted data 801.

The subscriber sends a message to the data gateway agent indicating unwanted data has been received or a particular Internet website should be blocked 805. Optionally, the message may be logged 806 and the subscriber's account credited for unwanted data transmissions 807. The type of data, either upstream or downstream is determined 810. The subscriber is invited to verify that future data transfers will be blocked from a source 830 or to a destination 840. If the subscriber does not confirm, the data transfer agent ignores the request and ends this subroutine 850.

Subscriber accounts may be configured to limit who can direct blocking of data or to allow all users to initiate blocking. If all users are allowed to block (or if only one user), then optional subscriber administrator login 840 is unnecessary. Otherwise, an administrator identification step is completed 840. For example, the subscriber administrator may be required to identify their self with password, known secret, biometric information etc.

Figure 8A:
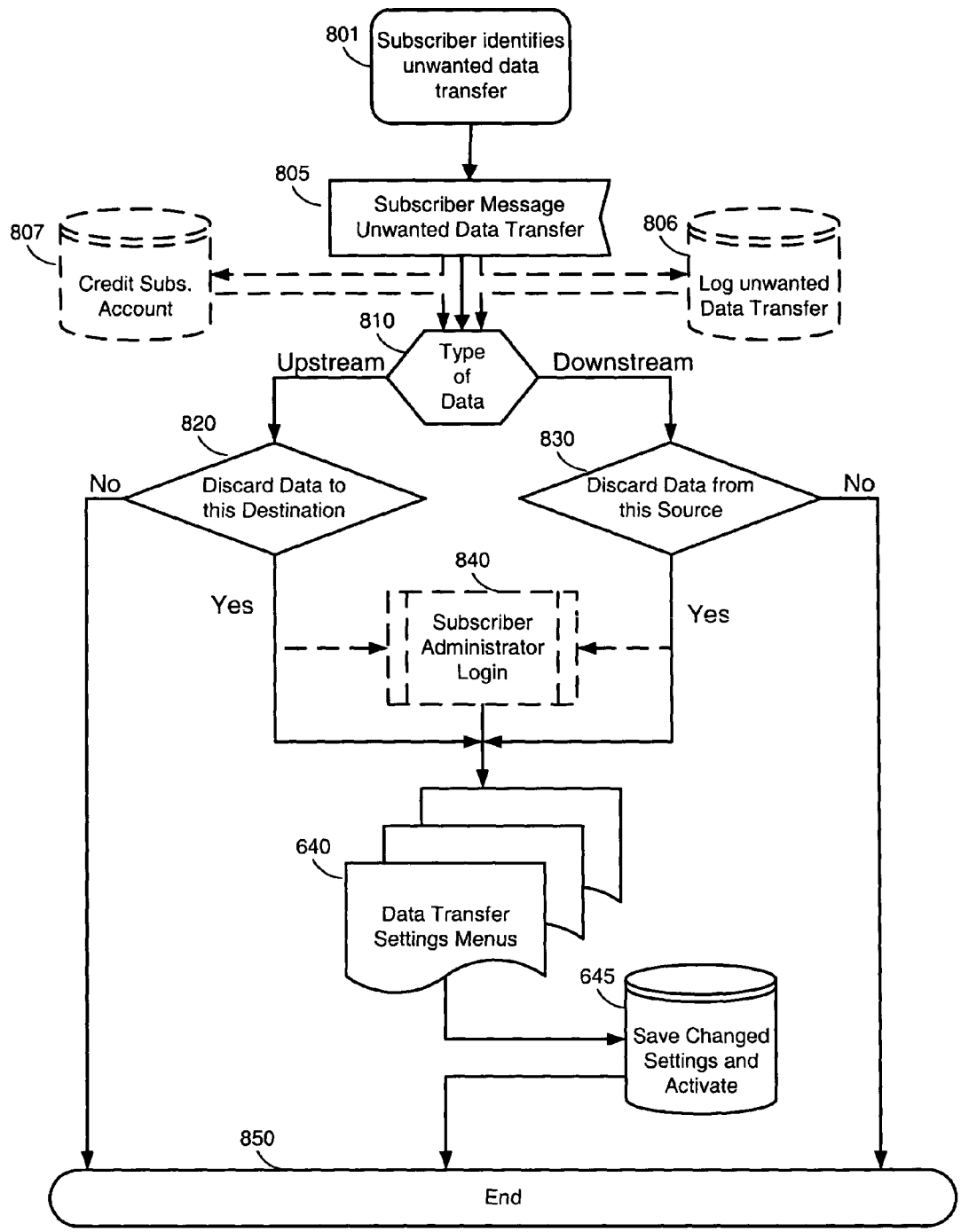
FIG. 8A illustrates a flow diagram of a subscriber dynamically changing data transfer settings in a consumption based billing environment after receiving unwanted data.
Figure 8B:
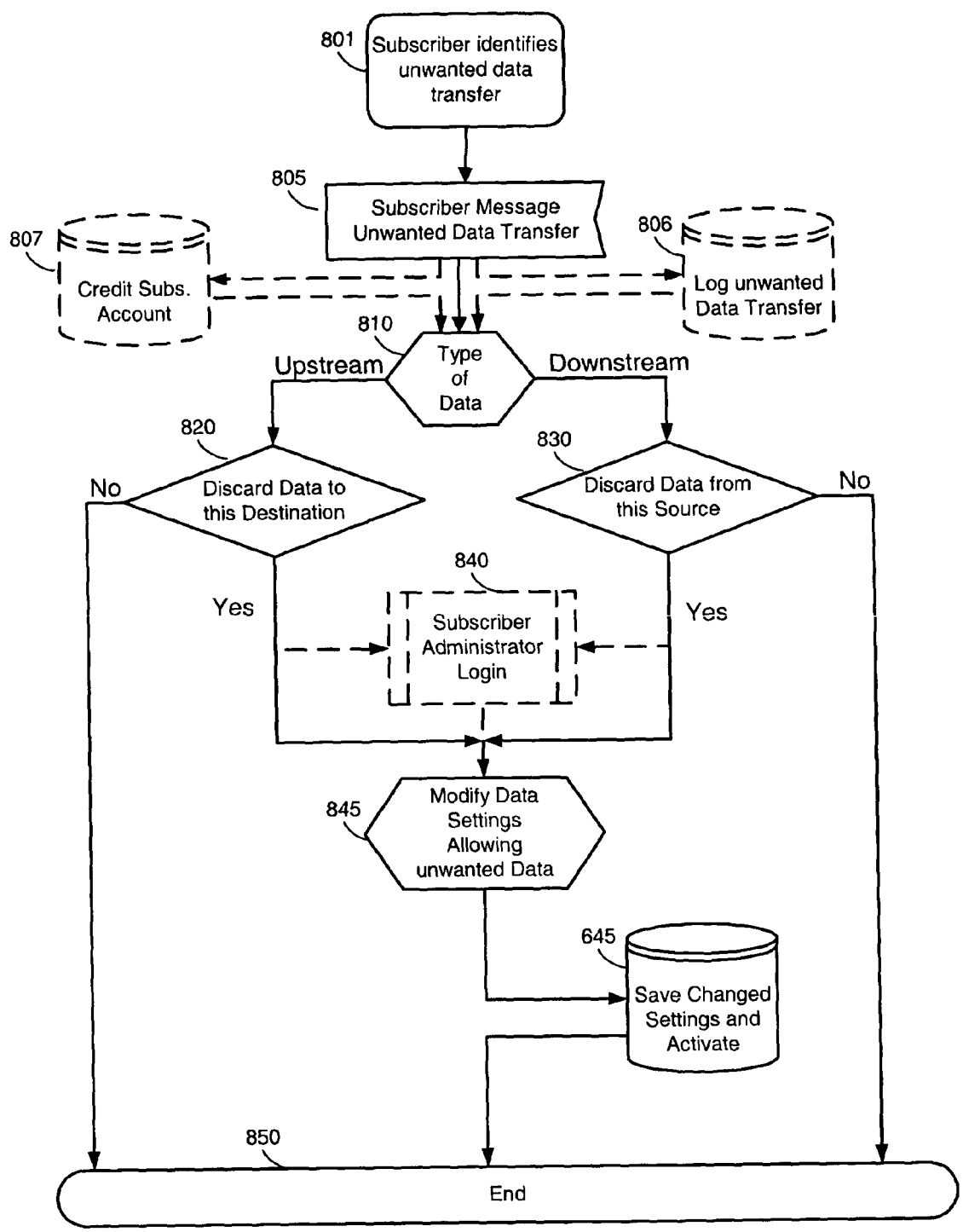
FIG. 8B illustrates a flow diagram of automatic changing data transfer settings in a consumption based billing environment when subscriber dynamically requests change after receiving unwanted data.

The data gateway agent of FIG. 8A then displays data transfer setting menus 640. After entry, any setting changes are stored and activated 645. The data gateway agent of FIG. 8B does not require subscriber entry. Instead, the gateway agent determines what changes are required to block the unwanted data traffic identified in step 801; automatically enter the changes 845; and then store and activate the required changes 645.

FIG. 9 through FIG. 12 present examples of menus for data transfer settings. FIG. 9 allows the selection of data filtering selections available to a subscriber. Corresponding to each selection is an associated exception table or detail menu that may be accessed using various subscriber inputs. For example, the keyboard combination Control-D may be programmed to access details of a given selection. Another method is to use drop down menus associated to a mouse "right-click" entry.

Exception lists permit the subscriber to set a general data filter and then allow known exceptions. For example, a subscriber could block data using hybrid stateful inspection and then permit as an exception downloaded webcasts from a reference website.

Detail menus augment the general settings menu. FIG. 10 is an example of URL filtering categories. The menu of FIG. 10 can first be used to select allowed Internet URL categories when accessed from FIG. 9 selection "URL Filtering-allow by category." FIG. 10 menu can later be used to select blocked URL categories when accessed from "URL Filtering—deny by category." In the alternative, FIG. 10 can include a block and deny selection adjacent to each URL category.

When FIG. 9 is used to select URL filtering by algorithm category, the subscriber makes individual selections on the detail menu of FIG. 11. From FIG. 11, URL allow exception lists and URL deny exception lists are accessed.

FIG. 12 allows entries for a consumption based billing subscriber desiring to limit data transfers by time. FIG. 12 includes general selections for weekday and weekend Internet use. In addition, a number of special time periods are allowed to be defined. The data gateway agent will first determine if the current time is within a special time period and permit or deny data transfers based upon the special entry. Next the gateway agent determines if the current time is a weekday (Monday through Friday) or a weekend (Saturday or Sunday).

Additional sophistication can be added to FIG. 12. For example, selections may be added for recognizing and entering holidays that are to be treated as weekends. Also, time control settings can be combined with other data filtering options so that different protocols of data can be blocked or allowed during different time segments.

As disclosed above, the present invention gives cable network subscribers control over data transfers for which they are responsible in a consumption based billing cable network. As subscribers are only responsible for desired data transfers, subscriber acceptance of consumption based billing is enhanced. Further, subscribers save the expense of maintaining additional anti-virus or anti-Spam software agents, with attendant computational overheads. Further, as undesired data transfers are eliminated, DOC carriers benefit by reducing cable network loading.

Although the present invention has been illustrated in terms of specific embodiments, various ways of accomplishing the enumerated steps are possible in accordance with the teachings described herein. For example, the present invention may incorporate the ability to filter specific Internet addresses based upon subscriber history, DOC carrier flags or externally maintained databases of Internet addresses categorized by data content. Additionally, the claims should not be read as limited to the described order of steps unless stated to that effect. Included in the invention are all embodiments that come within the scope, spirit and equivalents thereto of the following claims:

What is claimed is:

1. A system for providing data filtering from a cable modem termination system (CMTS) in a cable data network consisting essentially of:
   the CMTS, wherein the CMTS comprises a packet counter, wherein the packet counter determines a number of packets sent to a subscriber device from the CMTS (herein, "downstream packets") and a number of packets originating from the subscriber device and sent to the CMTS (herein, "upstream packets"), and a data gateway agent;
   a datastore accessible to the data gateway agent for storing a data transfer rule selected by a subscriber, wherein the selected data transfer rule comprises filtering criteria selected by the subscriber, and
   wherein the data gateway agent comprises instructions that cause the CMTS to:
      receive a packet prior to receipt of the packet by the packet counter;
      access the data transfer rule stored in the datastore;
      use the filtering criteria to determine whether the packet violates the data transfer rule;
      forward the packet to the packet counter for counting when the packet does not violate the data transfer rule; and
   apply a corrective measure to the packet when the packet violates the data transfer rule.

2. The system of claim 1, wherein the filtering criteria comprise packet payload criteria and the instruction to use the filtering criteria to determine whether the packet violates the data transfer rule comprises determining whether the packet comprises the packet payload criteria.

3. The system of claim 2, wherein the packet is an upstream packet and the packet payload criteria are selected from the group consisting of subscriber personal information, a telephone number, a social security number, a driver's license number, a credit card number, and location information.

4. The system of claim 1, wherein the filtering criteria further comprise a recurring time period and wherein the instruction to use the filtering criteria to determine whether the packet violates the data transfer rule comprises determining whether the packet is received during the recurring time period and comprises the packet payload criteria.

5. The system of claim 1, wherein the filtering criteria comprise protocol type criteria and wherein the instruction to use the filtering criteria to determine whether the packet violates the data transfer rule comprises determining whether the packet that is received at the CMTS uses a particular protocol.

6. The system of claim 1, wherein the filtering criteria comprise protocol criteria and the instruction to use the filtering criteria to determine whether the packet violates the data transfer comprises determining whether the packet received at the CMTS uses a particular protocol.

7. The system of claim 1, wherein the gateway agent further comprises instructions that cause the CMTS to:
   receive an upstream packet;
   create an entry in a connection database, wherein the entry in the connection database comprises an upstream packet identifier that identifies the upstream packet as originating from the subscriber device; and
   receive a downstream packet, wherein the filtering criteria comprises the upstream packet identifier, and wherein the instruction to use the filtering criteria to determine whether the packet violates the data transfer rule comprises determining whether the downstream packet comprises the upstream packet identifier.

8. The system of claim 1, wherein the CMTS further comprises a billing agent and wherein the billing agent is configured to receive a subscriber count trigger and to transmit a count message to the subscriber comprising a current packet count upon the receipt of the subscriber count trigger.

9. The system of claim 8, wherein the subscriber count trigger is selected from the group consisting of an end of billing cycle, a receipt of a subscriber count request message, a subscriber count exceeding a subscriber selected trigger amount, and a subscriber count exceeding data over a cable carrier selected trigger amount.

10. The system of claim 8 wherein the billing agent is further configured to automatically transmit an electronic message identifying current subscriber data transfer counts to the subscriber upon the occurrence of the subscriber count trigger.

11. The system of claim 2, wherein the cable network is a hybrid fiber coaxial cable network.

12. A method for providing data filtering from a cable modem termination system (CMTS) in a cable data network, wherein the CMTS comprises a packet counter, wherein the packet counter determines a number of packets sent to a subscriber device from the CMTS (herein, "downstream packets") and a number of packets originating from the subscriber device and sent to the CMTS (herein, "upstream packets"), and a data gateway agent, the method consisting essentially of:
   receiving a packet prior to receipt of the packet by the packet counter;
   accessing a data transfer rule selected by a subscriber stored in a datastore accessible to the data gateway agent, wherein the selected data transfer rule comprises filtering criteria selected by the subscriber, and
   using the filtering criteria to determine whether the packet violates the data transfer rule;
   forwarding the packet to the packet counter for counting when the packet does not violate the data transfer rule; and
   applying a corrective measure to the packet violates the data transfer rule.

13. The method of claim 12, wherein the filtering criteria comprise payload criteria and wherein using the filtering criteria to determine whether the packet violates the data transfer rule comprises using the filtering criteria to determine whether the packet comprises the packet payload criteria.

14. The method of claim 13, wherein the packet is an upstream packet and the payload criteria are selected from the group consisting of subscriber personal information, a telephone number, a social security number, a driver's license number, a credit card number, and location information.

15. The method of claim 12, wherein the filtering criteria further comprise a recurring time period and wherein using the filtering criteria to determine whether the packet violates the data transfer rule comprises using the filtering criteria to determine whether the packet is received during the recurring time period and comprises the packet payload criteria.

16. The method of claim 12, wherein the filtering criteria comprise packet protocol criteria and wherein using the filtering criteria to determine whether the packet violates the data transfer rule comprises using the filtering criteria to determine whether the packet that is received at the CMTS uses a particular protocol.

17. The method of claim 12, wherein the filtering criteria comprise protocol criteria and wherein using the filtering criteria to determine whether the packet violates the data transfer rule comprises using the filtering criteria to determine whether the packet received at the CMTS uses a particular protocol.

18. The method of claim 12 further comprising:
   receiving an upstream packet;
   creating an entry into a connection database, wherein the entry in the connection database comprises an upstream packet identifier that identifies the upstream packet as originating from the subscriber device; and
   receiving a downstream packet, and
   wherein the filtering criteria comprise the upstream packet identifier, and wherein using the filtering criteria to determine whether the packet violates the data transfer rule comprises using the filtering criteria to determine whether the downstream packet comprises the upstream packet identifier.

19. The method of claim 12, wherein the CMTS further comprises a billing agent and wherein the method further comprises configuring the billing agent to receive a subscriber count trigger and to transmit a count message to the subscriber comprising a current packet count upon the receipt of the subscriber count trigger.

20. The method of claim 19, wherein the subscriber count trigger is selected from the group consisting of an end of billing cycle, a receipt of a subscriber count request message, a subscriber count exceeding a subscriber selected trigger amount, and a subscriber count exceeding data over a cable carrier selected trigger amount.

21. The method of claim 19 further comprising configuring the billing agent to automatically transmit an electronic message identifying current subscriber data transfer counts to the subscriber upon the occurrence of the subscriber count trigger.

22. The method of claim 12, wherein the cable network is a hybrid fiber coaxial cable network.

23. The method of claim 12 further comprising:
   sending the subscriber device a notification message when the packet violates the data transfer rule, wherein the notification message comprises a request for selection of an option from the group consisting of an option to allow the packet to be sent or received and an option to not allow the packet to be sent or received;
   receiving a response from the subscriber device comprising the selected option;
   discarding the packet when the selected option is to not allow the packet to be sent or received; and
   forwarding the packet to the packet counter for counting when the selected option is to allow the packet to be sent or received.

24. The system of claim 1, wherein the gateway agent further comprises instructions that cause the CMTS to:
   send the subscriber device a notification message when the packet violates the data transfer rule, wherein the notification message comprises a request for selection of an option from the group consisting of an option to allow the packet to be sent or received and an option to not allow the packet to be sent or received;
   receive a response from the subscriber device comprising the selected option;
   discard the packet when the selected option is to not allow the packet to be sent or received; and
   forward the packet to the packet counter for counting when the selected option is to allow the packet to be sent or received.

* * * * *